(12) United States Patent  
Tsuru

(10) Patent No.: US 7,132,964 B2  
(45) Date of Patent: Nov. 7, 2006

(54) CODING APPARATUS, PROGRAM AND DATA PROCESSING METHOD

(75) Inventor: Daisuke Tsuru, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/196,625

(22) Filed: Aug. 3, 2005

(65) Prior Publication Data

US 2005/0270192 A1 Dec. 8, 2005

Related U.S. Application Data

(63) Continuation of application No. 11/013,162, filed on Dec. 15, 2004, now Pat. No. 6,950,040.

(30) Foreign Application Priority Data

Dec. 17, 2003 (JP) ............................. 2003-419698

(51) Int. Cl.  
*H03M 7/40* (2006.01)

(52) U.S. Cl. ......................................... 341/67; 341/51

(58) Field of Classification Search ................ 341/50, 341/51, 52, 67, 94, 107  
See application file for complete search history.

(56) References Cited

U.S. PATENT DOCUMENTS

| | | |
|---|---|---|
| 5,363,099 A | 11/1994 | Allen |
| 5,751,232 A | 5/1998 | Inoue et al. |
| 5,859,604 A | 1/1999 | Slattery et al. |
| 5,867,167 A * | 2/1999 | Deering ...................... 345/419 |
| 5,973,629 A | 10/1999 | Fujii |
| 5,999,218 A * | 12/1999 | Yokoyama .............. 375/240.05 |
| 6,304,196 B1 | 10/2001 | Copeland et al. |
| 6,351,570 B1 * | 2/2002 | Kobayashi .................. 382/250 |
| 6,504,493 B1 | 1/2003 | Burd |
| 6,603,413 B1 * | 8/2003 | Igarashi et al. ................ 341/67 |
| 6,643,408 B1 * | 11/2003 | Kobayashi .................. 382/250 |
| 6,654,926 B1 | 11/2003 | Raphaeli et al. |
| 6,765,514 B1 | 7/2004 | Chang et al. |

* cited by examiner

*Primary Examiner*—Linh Nguyen  
(74) *Attorney, Agent, or Firm*—Finnegan, Henderson, Farabow, Garrett & Dunner, L.L.P.

(57) ABSTRACT

A coding apparatus, a program and a data processing method capable of attaining a high speed and a reduction of a computation amount in coding processing is provided, wherein coding portions for performing a left shift operation on a range and a lower limit value until the range exceeds a predetermined value and performing coding in accordance with the lower limit value before performing the left shift operation comprise a bit position specifying portion for specifying a bit position indicating a first logic value being closest to the MSB in a range; a shift amount specifying portion for specifying a shift amount immediately before the range exceeds a predetermined value by a left shift operation based on the bit position; a judging portion for judging whether there is a free space exceeding the shift amount in a predetermined bit length of extended region data added to the MSB side of the lower limit value, wherein bit data is carried from the lower limit value by the left shift operation; and an extended data coding portion for generating coding data of data stored in the extended region data by the left shift operation when there is not a free space.

3 Claims, 16 Drawing Sheets

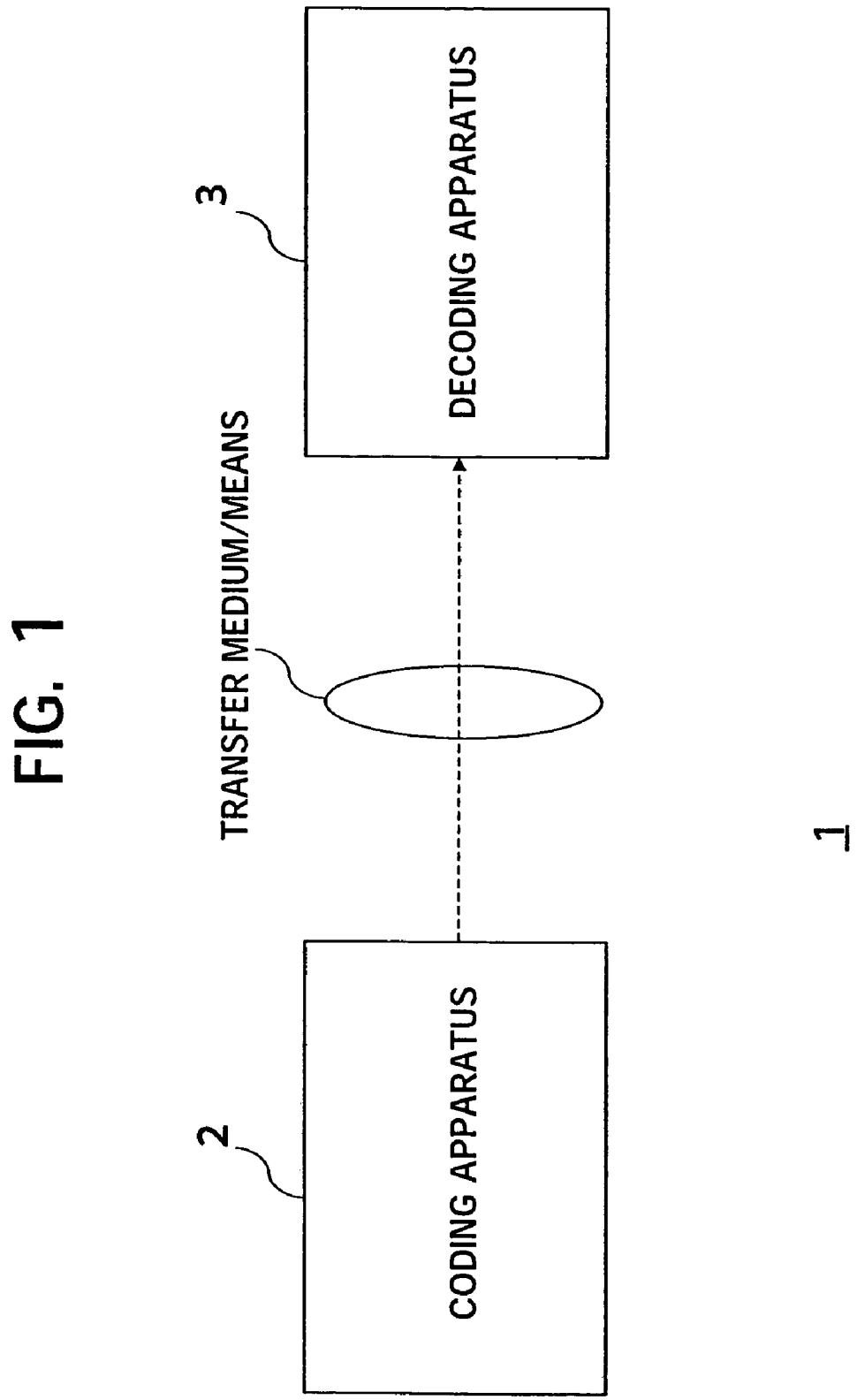

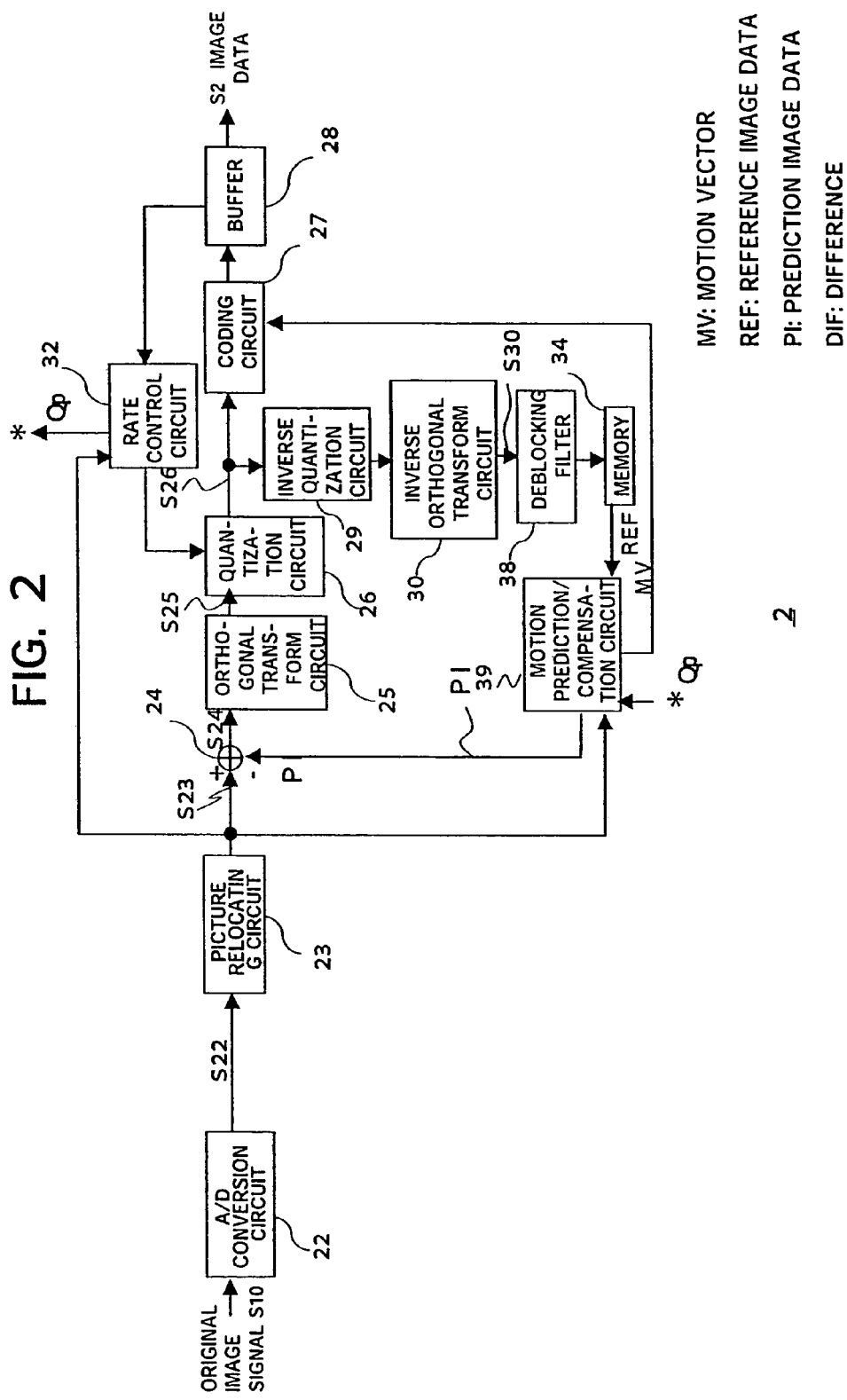

CODING APPARATUS, PROGRAM AND DATA PROCESSING METHOD

RELATED APPLICATIONS

This application is a continuing data of application 11/013,162 filed on Dec. 15, 2004 (U.S. Pat. No. 6,950,040 public on Sep. 27, 2005).

BACKGROUND OF THE INVENTION

1. Field of the Invention

The present invention relates to a coding apparatus, a program and a data processing method for performing arithmetic encoding and other encoding processing on data, such as image data and audio data.

2. Description of the Related Art

In recent years, apparatuses for handling image data in a digital form and conforming to the MPEG (Moving Picture Experts Group) and other method for performing compression by orthogonal transformation, such as discrete cosine transformation, and motion compensation by using redundancy peculiar to image information on an object of attaining highly efficient information transmission and storage have been widespread both in information distribution by broadcast stations and information receiving in households.

The MPEG system is followed by a coding method called JVT (Joint Video Team) proposed for realizing a still higher compression rate. For example, refer overview of the H.264/AVC Video Coding Standard, "IEEE Transactions Circuits and Systems for Video Technology", the U.S.A., July 2003, by Thomas Wiegand, Gary J. Sullivan, Gisle Bjontegaard, and Ajay Luthra.

In the JVT system, two types of coding processing, which are CAVLC (Context Based Adaptive Variable Length Coding) and CABAC (Context Adaptive Binary Arithmetic Coding), are regulated as coding processing of a syntax element (SE).

For example, in the above coding processing, massive data is input and an enormous amount of arithmetic processing has to be performed, and there is a demand for coding processing at a higher speed with a reduced computation amount.

SUMMARY OF THE INVENTION

An object of the present invention is to provide a coding apparatus, a program and a data processing method capable of attaining a higher speed and reduced computation amount in coding processing.

To attain the above object, a coding apparatus for carrying out a context adaptive binary arithmetic coding to a syntax element representing an image signal to be coded, where a size of a range between first data with high appearance probability and second data with low appearance probability is defined by a first data, and a lower limit indicating a boundary between the first and second data is defined by a second data, and performing a shift operation to the first data and the second data in this sequence, in a direction from a least significant bit (LSB) to a most significant bit (MSB) until the shifted first data exceeds a predetermined value, and generating a coded data responsive to the shifted second data immediately before the finish of the shift operation, the coding-apparatus comprising: a bit position specifying means for specifying a bit position indicating a first logical value, most close to the MSB in the first data; a shift amount specifying means for specifying a shift amount of the first data immediately before the finish of the shift operation on the basis of the bit position specified by the bit position specifying means; a judging means for judging the existence or not of an empty region having a size exceeding the shift amount specified at the shift amount specifying means, in an expansion data having a predetermined bit length which is added to the MSB of the second data and is carried up a digit of a bit data from the second data by the shift operation; and a coding means for generating the coded data from the data accommodated in the expansion data by the shift operation when not existing of the empty region.

An operation of the coding apparatus of the first aspect of the present invention is as below.

A bit position specifying means specifies a bit position indicating a first logic value being closest to the MSB (most significant bit) in first data.

A shift amount specifying means specifies a shift amount immediately before the first data exceeds a predetermined value by a left-shift operation based on the bit position specified by the bit position specifying means.

A judging means determines whether there is a free space larger than the shift amount specified by the shift amount specifying means in a predetermined bit length of extended data added to the MSB side of second data, wherein bit data is carried from the second data by a left-shift operation.

A coding means generates coding data of data stored in the extended data by a left shift operation when the judging means determines there is not a free space.

Furthermore, to attain the above object, a coding apparatus of a second aspect of the present invention is a coding apparatus for carrying out a context adaptive binary arithmetic coding to a syntax element representing an image signal to be coded, where a size of a range between first data with high appearance probability and second data with low appearance probability is defined by a first data, and a lower limit indicating a boundary between the first and second data is defined by a second data, and performing a shift operation to the first data and the second data in this sequence, in a direction from a least significant bit (LSB) to a most significant bit (MSB) until the shifted first data exceeds a predetermined value, and generating a coded data responsive to the shifted second data immediately before the finish of the shift operation, the coding apparatus comprising: a bit position specifying means for specifying a bit position indicating a first logical value, most close to the MSB in the first data; a shift amount specifying means for specifying a shift amount of the first data immediately before the finish of the shift operation on the basis of the bit position specified by the bit position specifying means; a judging means for judging the existence or not of a predetermined bit length data in an expansion data having a predetermined bit length which is added to the MSB of the second data and is carried up a digit of a bit data from the second data by the shift operation; and a coding means for generating the coded data from the data accommodated in the expansion data by the shift operation when not existing of the predetermined bit length data.

Furthermore, to attain the above object, a coding apparatus of a third aspect of the present invention is a coding apparatus comprising: a motion vector generating means for generating a motion vector on the basis of a first difference between an image data to be processed a motion compensation and a reference image data used as a reference for the motion compensation; a first signal processing means for carrying out an orthogonal transform processing to a second difference between the image data to be processed the motion compensation and a predicted image data, and a quantification processing to the result of the orthogonal transform; a second signal processing means for carrying out an inverse quantification processing to the data generated by the first signal processing means and an inverse orthogonal transform to the data obtained by the inverse quantification processing to thereby generate a reference data; a third signal processing means for generating the predicted image data on the basis of the motion vector and the reference image data; and a coding means for coding the data generated by the first signal processing means and the motion vector, the coding means for carrying out a context adaptive binary arithmetic coding to a syntax element representing an image signal to be coded, where a size of a range between first data with high appearance probability and second data with low appearance probability is defined by a first data, and a lower limit indicating a boundary between the first and second data is defined by a second data, and performing a shift operation to the first data and the second data in this sequence, in a direction from a least significant bit (LSB) to a most significant bit (MSB) until the shifted first data exceeds a predetermined value, and generating a coded data responsive to the shifted second data immediately before the finish of the shift operation, the coding means comprising: a bit position specifying means for specifying a bit position indicating a first logical value, most close to the MSB in the first data; a shift amount specifying means for specifying a shift amount of the first data immediately before the finish of the shift operation on the basis of the bit position specified by the bit position specifying means; a judging means for judging the existence or not of an empty region having a size exceeding the shift amount specified at the shift amount specifying means, in an expansion data having a predetermined bit length which is added to the MSB of the second data and is carried up a digit of a bit data from the second data by the shift operation; and a coded data generating means for generating the coded data from the data accommodated in the expansion data by the shift operation when not existing of the empty region.

Furthermore, to attain the above object, a program according to a fourth aspect of the present invention is a program executed on a computer for carrying out a context adaptive binary arithmetic coding to a syntax element representing an image signal to be coded, where a size of a range between first data with high appearance probability and second data with low appearance probability is defined by a first data, and a lower limit indicating a boundary between the first and second data is defined by a second data, and performing a shift operation to the first data and the second data in this sequence, in a direction from a least significant bit (LSB) to a most significant bit (MSB) until the shifted first data exceeds a predetermined value, and generating a coded data responsive to the shifted second data immediately before the finish of the shift operation, the program comprising: a first procedure for specifying a bit position indicating a first logical value, most close to the MSB in the first data; a second procedure for specifying a shift amount of the first data immediately before the finish of the shift operation on the basis of the bit position specified by the first procedure; a third procedure for judging the existence or not of an empty region having a size exceeding the shift amount specified at the second procedure, in an expansion data having a predetermined bit length which is added to the MSB of the second data and is carried up a digit of a bit data from the second data by the shift operation; and a fourth procedure for generating the coded data from the data accommodated in the expansion data by the shift operation when not existing of the empty region.

Furthermore, to attain the above object, a program of a fifth aspect of the present invention is a program executed on a computer for carrying out a context adaptive binary arithmetic coding to a syntax element representing an image signal to be coded, where a size of a range between first data with high appearance probability and second data with low appearance probability is defined by a first data, and a lower limit indicating a boundary between the first and second data is defined by a second data, and performing a shift operation to the first data and the second data in this sequence, in a direction from a least significant bit (LSB) to a most significant bit (MSB) until the shifted first data exceeds a predetermined value, and generating a coded data responsive to the shifted second data immediately before the finish of the shift operation, the coding apparatus comprising a first procedure for specifying a bit position indicating a first logical value, most close to the MSB in the first data; a second procedure for specifying a shift amount of the first data immediately before the finish of the shift operation on the basis of the bit position specified by the bit position specifying means; a third procedure judging the existence or not of a predetermined bit length data in an expansion data having a predetermined bit length which is added to the MSB of the second data and is carried up a digit of a bit data from the second data by the shift operation; and a fourth procedure for generating the coded data from the data accommodated in the expansion data by the shift operation when not existing of the predetermined bit length data.

Furthermore, to attain the above object, a data processing method of a sixth aspect of the present invention is a data processing method for carrying out a context adaptive binary arithmetic coding to a syntax element representing an image signal to be coded, where a size of a range between first data with high appearance probability and second data with low appearance probability is defined by a first data, and a lower limit indicating a boundary between the first and second data is defined by a second data, and performing a shift operation to the first data and the second data in this sequence, in a direction from a least significant bit (LSB) to a most significant bit (MSB) until the shifted first data exceeds a predetermined value, and generating a coded data responsive to the shifted second data immediately before the finish of the shift operation, the method comprising: a first step for specifying a bit position indicating a first logical value, most close to the MSB in the first data; a second step for specifying a shift amount of the first data immediately before the finish of the shift operation on the basis of the bit position specified in the second step; a third step for judging the existence or not of an empty region having a size exceeding the shift amount specified at the second step, in an expansion data having a predetermined bit length which is added to the MSB of the second data and is carried up a digit of a bit data from the second data by the shift operation; and a fourth step for generating the coded data from the data accommodated in the expansion data by the shift operation when not existing of the empty region.

According to the present invention, a coding apparatus, a program and a data processing method capable of attaining a higher speed and a reduced computation amount in coding processing.

BRIEF DESCRIPTION OF DRAWINGS

These and other objects and features of the present invention will become clearer from the following description of the preferred embodiments given with reference to the attached drawings, in which:

FIG. 1 is a schematic view of a communication system 1 of the present embodiment;

FIG. 2 is a view of the overall configuration of a coding apparatus 2 shown in FIG. 1;

DESCRIPTION OF THE PREFERRED EMBODIMENT

Figures 3A, 3B, 3C, 3D, 3E:
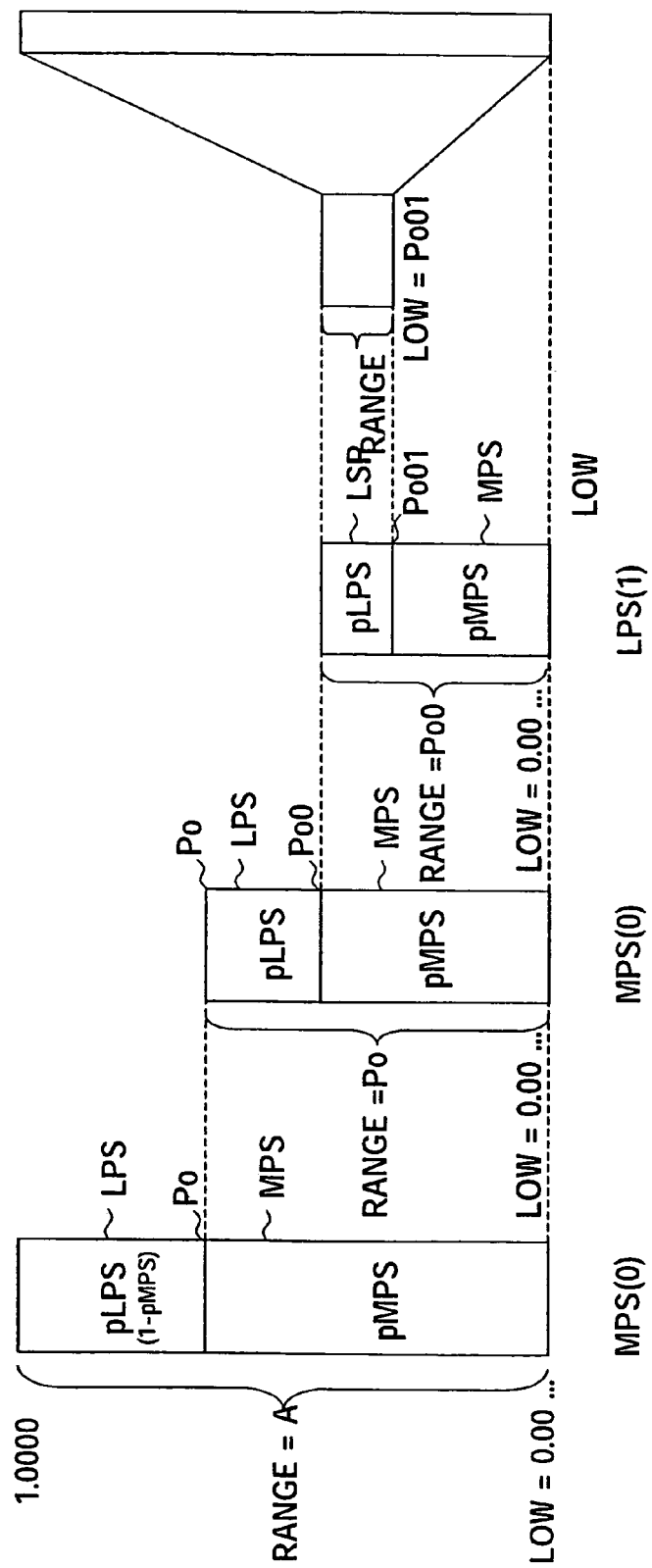
FIG. 3 is a view for explaining arithmetic coding processing.

Below, a coding apparatus of a JVT system wherein coding processing according to an embodiment of the present invention is applied will be explained.

FIG. 1 is a schematic view of a communication system 1 of the present embodiment.

As shown in FIG. 1, the communication system 1 comprises a coding apparatus 2 provided at a transmission side and a decoding apparatus 3 provided at a receiving side.

In the communication system 1, in the coding apparatus 2 at the transmission side, frame image data (bit stream) compressed by orthogonal transform, such as discrete cosine transform and Karhunen-Loeve transform, and motion compensation is generated, and the frame image data is modulated in the coding apparatus 2 at the transmission side before being transmitted via a transfer media and/or means, such as artificial satellite broadcast wave, a cable TV network, a telephone line network, a cellular phone network.

At the receiving side, after demodulating a received image signal, frame image data decompressed by inverse orthogonal transform from that at the modulation above and motion compensation is generated and used.

Note that the transfer media and/or means may be an optical disk, magnetic disk, semiconductor memory and other recording media.

A decoding apparatus 3 shown in FIG. 1 performs decoding corresponding to coding of the coding apparatus 2 and has the same configuration as that of the related art.

Below, the coding apparatus 2 shown in FIG. 1 will be explained.

FIG. 2 is a view of the overall configuration of the coding apparatus 2 shown in FIG. 1.

As shown in FIG. 2, the coding apparatus (data processing apparatus: computer) 2 comprises, for example, an A/D conversion circuit 22, a picture relocating circuit 23, an arithmetic circuit 24, an orthogonal transform circuit 25, a quantization circuit 26, a coding circuit (also referred to as a Coding apparatus) 27, a buffer 28, an inverse quantization circuit 29, an inverse orthogonal transform circuit 30, a rate control circuit 32, a frame memory 34, a deblocking filter 38 and a motion prediction/compensation circuit 39 as main components.

Below, the components of the coding apparatus 2 will be explained.

The A/D conversion circuit 22 converts an original image signal S10 composed of an input analog luminance signal Y and color-difference signals Cb and Cr to a digital frame data S22 and outputs the same to the picture relocating circuit 23.

The picture relocating circuit 23 outputs frame data S23 obtained by rearranging the frame data S22 input from the A/D conversion circuit 22 in a sequence of coding in accordance with the GOP (Group of Pictures) configuration composed of picture types I, P and B, to the arithmetic circuit 24, the rate control circuit 32 and the motion prediction/compensation circuit 39.

The arithmetic circuit 24 generates image data S24 indicating difference between a motion compensation block MCB (also referred to as a macro block) to be subjected to the processing in the frame data S23 and a motion compensation block MCB of prediction image data PI input from the motion prediction/compensation circuit 39 corresponding thereto, and outputs the same to the orthogonal transformation circuit 25.

The orthogonal transform circuit 25 performs discrete cosine transform, Karhunen-Loeve transform or other orthogonal transform on the image data S24 to generate image data (for example, a DCT coefficient) S25, and outputs the same to the quantization circuit 26.

The quantization circuit 26 generates image data S26 by quantizing the image data S25 with a quantization scale input from the rate control circuit 32, and outputs the same to the coding circuit 27 and the inverse quantization circuit 29.

The coding circuit 27 performs variable length coding processing or arithmetic coding processing based on a syntax element (SE) indicating a motion vector, etc. and stores image data as the processing result in the buffer 28.

At this time, for example, when inter prediction coding is performed, the coding circuit 27 encodes a motion vector MV input from the motion prediction/compensation circuit 39 and stores the same in header data.

Image data stored in the buffer 28 is modulated, etc. before being transmitted.

The inverse quantization circuit 29 generates a signal obtained by performing inverse quantization on the image data S26 of the motion compensation block MCB of reference image data referred to from other motion compensation block MCB, and outputs the same to an inverse orthogonal transform circuit 30.

The inverse orthogonal transform circuit 30 writes image data S30, obtained by performing inverse transform of the orthogonal transform in the orthogonal transform circuit 25 on the data input from the inverse quantization circuit 29, to the frame memory 34 via the deblocking filter 38.

The deblocking filter 38 outputs to a frame memory 34 image data obtained by removing block skew from the image data S30.

The rate control circuit 32 generates a quantization parameter Qp, so that fine quantization is performed on a highly complicated portion in an image and rough quantization is performed on a less complicated portion in the image, for example, based on the frame data S23 input from the picture relocating circuit 23.

Then, the rate control circuit 32 generates a quantization scale based on the above generated quantization parameter Qp and image data read from the buffer 28, and outputs the same to the quantization circuit 26.

Also, the rate control circuit 32 outputs the above generated quantization parameter Qp to the motion prediction/compensation circuit 39.

The motion prediction/compensation circuit 39 searches in a search range SR in reference image data based on the frame data S23 to be encoded and reference image data REF from the frame memory 34, performs motion prediction/compensation processing, and calculates a motion vector MV by using a motion compensation block MCB as a unit.

At this time, the motion prediction/compensation circuit 39 encodes an I picture, P picture and B picture. Here, the I picture is encoded only from information of the I picture and indicates image data on which inter-frame prediction (inter-prediction coding) is not performed.

The P picture indicates image data encoded by performing prediction based on a previous (past) I picture and P picture on a display order.

The B picture indicates image data encoded by bidirectional prediction based on the I picture and P picture at previous (past) and successive (future) display order.

As a block size of the motion prediction block (macro block MB), pixel sizes of 16×16, 8×16, 16×8 and 8×8 are defined, and pixel sizes of 8×8, 4×8, 8×4 and 4×4 are also defined.

The motion prediction/compensation circuit 39 specifies in a search range SR of the reference image data REF a position of a motion compensation block MCB being least different from a motion compensation block MCB to be encoded in the frame data S23, and calculates a motion vector MV corresponding to a positional relationship of them.

Also, the motion prediction/compensation circuit 39 generates prediction image data PI on a motion compensation block MCB based on the above selected motion vector MV.

The motion prediction/compensation circuit 39 outputs the above selected motion vector MV to the coding circuit 27 and outputs the above generated prediction image data PI to the arithmetic circuit 24.

Below, coding processing of the coding circuit 27 will be explained in detail.

In JVT system coding processing, two kinds, CAVLC and CABAC, are defined as coding methods of a syntax element (SE). The CABAC generally compresses the SE with higher efficiency comparing with the CAVLC.

In the CABAC defined by the JVT, the syntax element SE is transformed to a symbol string by the VLC and fixed length coding. Each symbol of the symbol string transformed here will be referred to as a "bin" (binary symbol).

In the coding processing, the "bin" is used as an input to perform arithmetic coding processing (AC), and an output bit is determined based on the processing result and output to a bit stream.

FIG. 3 is a view for explaining arithmetic coding processing.

The arithmetic coding processing is to project data string, such symbol and binary (0 and 1) string, to be encoded on a section [0, 1] in accordance with the appearance probability, and express a probability space as a binary number by the number in the section on a number line and code the same.

For example, the arithmetic coding processing is, as shown in FIG. 3, to divide a section of 0.00 or more and less than 1.00 based on appearance probability of respective data in data to be encoded, and perform recursive processing for selecting the divided sections based on the respective data so as to encode data indicating a section corresponding to the data to be encoded.

Hereinafter, data to be encoded is assumed to be binary for a plain explanation.

The arithmetic coding processing is, specifically as shown in FIG. 3A, by assuming that data with high appearance probability is MPS (Most Probable Symbol) and data with low appearance probability is LPS (Least Probable Symbol) in the data to be encoded, to divide a predetermined section A in accordance with the respective appearance probability pMPS and pLPS. At this time, it is assumed that a size of a current section is a range "Range" and a boundary value between current sections, for example, the lower limit value is "Low". Also, the appearance probability pMPS is 1−pLPS.

In an initial state, as shown in FIG. 3A, values of the "Range" and "Low" are A, 0.00 . . . .

When top data of a data string to be encoded is the MPS, as shown in FIG. 3A, the section A is divided in accordance with the appearance probability pMPS and pLPS, and as shown in FIG. 3B, a section corresponding to the MPS is selected from the divided sections. Values of "Range" and "Low" at this time are p0(=pMPS), 0.00 . . . .

When second data in the data string to be encoded is the MPS, as shown in FIG. 3B, the section is divided in accordance with the appearance probability pMPS and pLPS and, as shown in FIG. 3C, a section corresponding to the MPS is selected from the divided sections. Values of "Range" and "Low" at this time are p00(=p0×pMPS), 0.00 . . . .

When third data in the data string to be encoded is the LPS, as shown in FIG. 3C, the section is divided in accordance with the appearance probability pMPS and pLPS and, as shown in FIG. 3D, a section corresponding to the LPS is selected from the divided sections. Values of "Range" and "Low" at this time are p001(=p00×pLPS), p001(Low+pMPS).

Namely, in the case of the LPS in the above coding processing, the lower limit value "Low" is updated by being-added with pMPS.

Also, as a bit length of a data string to be encoded becomes longer, the "Range" becomes shorter and the number of bits of data indicating the "Range" increases. Therefore, as a result of the coding processing, a memory capacity is reduced by outputting determined bits.

Furthermore, to maintain calculation accuracy, as shown in FIG. 3E, normalizing processing (renormalize) for extending the "Range" to be larger than a predetermined value is performed. For example, the normalizing processing is to double the "Range" value to make it larger than the predetermined value.

Figure 4:
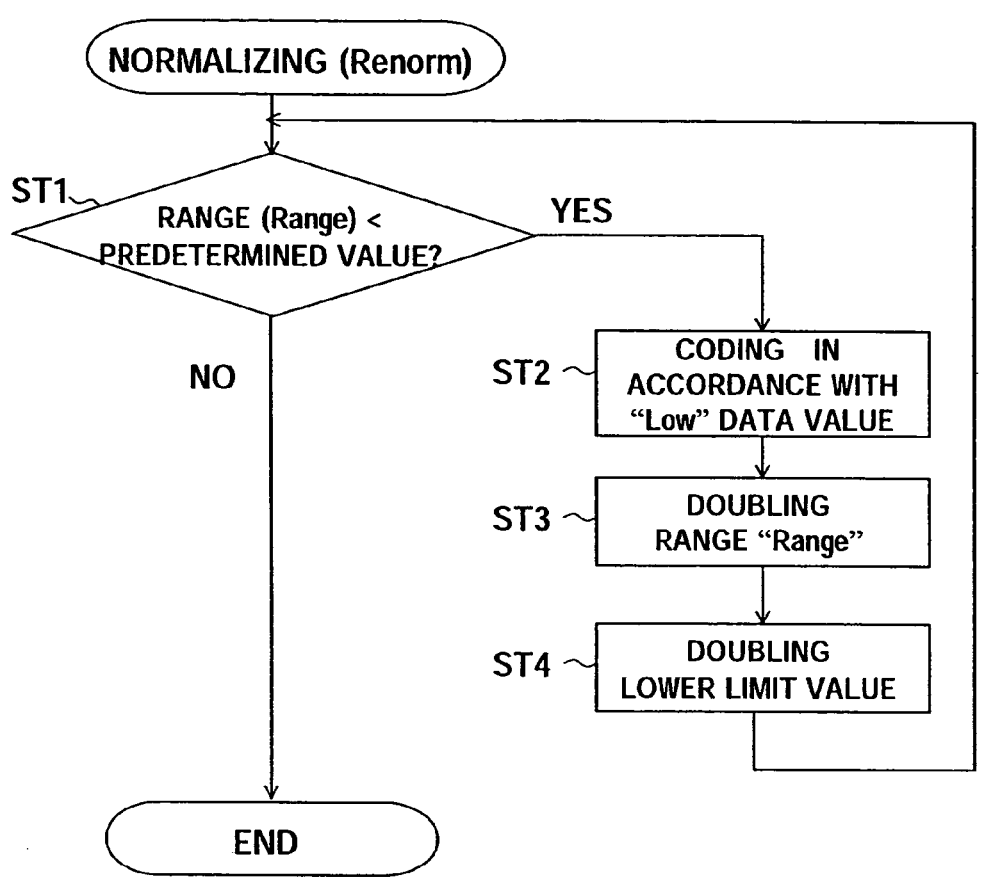
FIG. 4 is a view for explaining normalizing processing in general coding processing.

FIG. 4 is a view for explaining normalizing processing in general coding processing.

For example, as explained above, normalizing processing as shown in FIG. 4 is performed every time the coding processing in unit of one bit is performed on data string to be encoded.

Specifically, first, whether the "Range" is smaller than a preset predetermined value or not is determined (ST1). When it is smaller than the predetermined value, a code in accordance with a highest one bit of the lower limit value "Low" is output (ST2), then, values of the "Range" and "Low" are subjected to a left shift operation extended to be doubled (ST3 and ST4), and the procedure returns back to the processing in the step ST1.

The operation from ST1 to ST4 is repeated until the value of the "Range" becomes a predetermined value or larger.

On the other hand, in the step ST1, when the value of the "Range" is not less than a predetermined value, the normalization processing finishes.

As explained above, in the normalizing processing in the coding processing, it is necessary to determine whether the "Range" is a predetermined value or not for every bit, so that a computation load is extremely heavy. In the coding circuit 27 according to the present invention, processing is not performed for every highest one bit of the lower limit value "Low" as explained above, but the processing is performed on lower limit values "Low" at a time, so that the determining processing is reduced and the computation speed becomes high. Below, the details will be explained.

Figure 5:
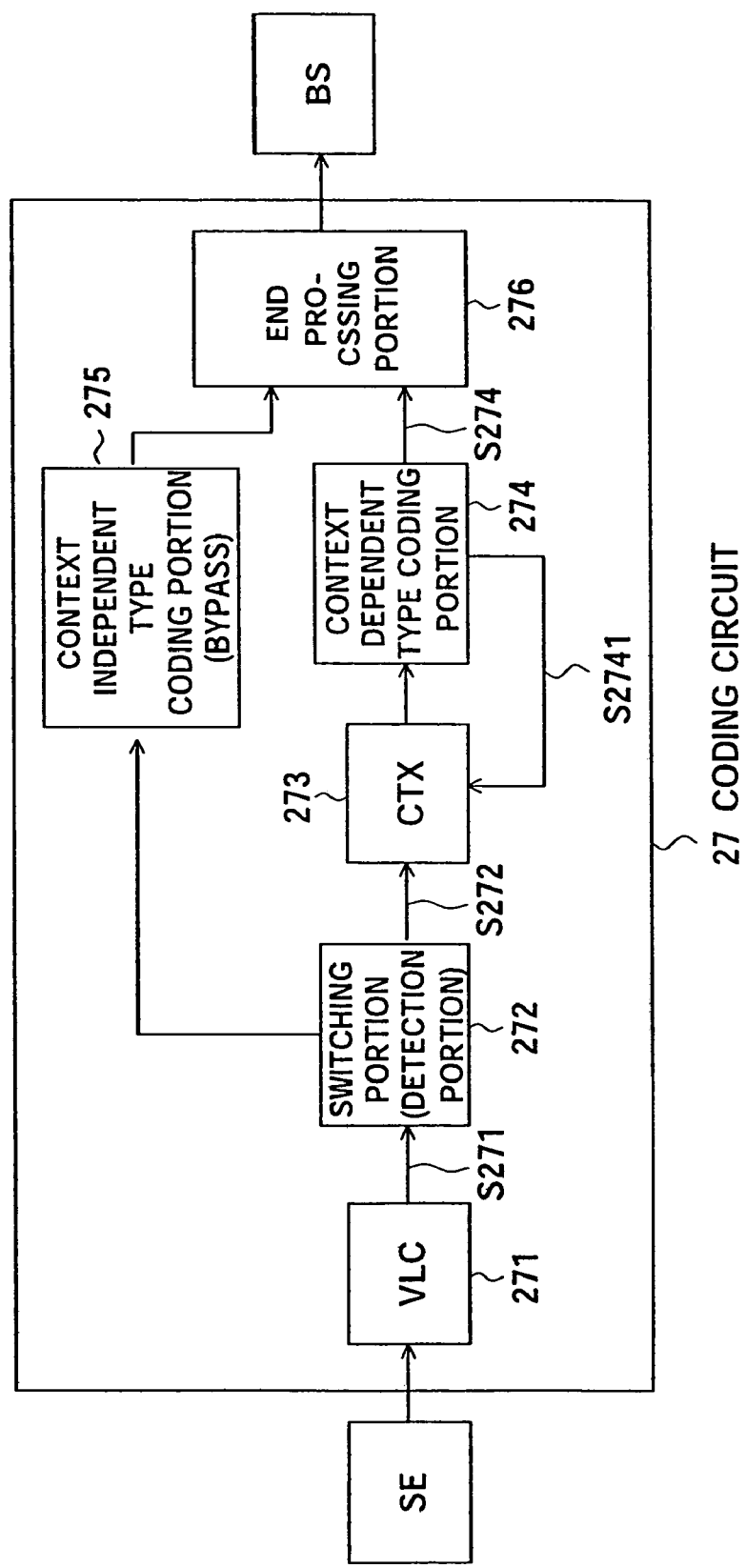
FIG. 5 is a block diagram of a function of a coding circuit according to a first embodiment of the present invention shown in FIG. 1.

FIG. 5 is a block diagram of a function of a coding circuit according to the first embodiment of the present invention shown in FIG. 1.

The coding circuit 27 according to the present embodiment comprises, for example as shown in FIG. 5, a symbol conversion portion (VLC) 271, a switching portion (detection portion) 272, a context (CTX) 273, a context dependent type coding portion 274, a context independent type coding portion (Bypass) 275 and an end processing portion 276.

The symbol conversion portion (VLC) 271 converts, for example, the syntax element SE input from the quantization circuit 26 and the motion prediction/compensation circuit 39 to a symbol "bin" (binary symbol) string (bit data) by the VLC and a fixed length coding, and output the same as a signal S271.

The switching portion 272 determines which of context dependent type coding processing and context independent type coding processing should be performed on the symbol "bin" as an input signal S271 and, in accordance with the determined result, outputs a signal S271 to either of the context dependent type coding portion 274 and the context independent type coding portion 275.

Specifically, when performing the context-dependent type coding processing on the symbol "bin", the switching portion 272 outputs the signal S271 to the context (CTX) 273 and the context dependent type coding portion 274, while outputs the signal 271 to the context independent type coding portion 275 when performing the context independent type coding processing.

Specifically, the switching portion 272 outputs the signal S271 to the context independent type coding portion (Bypass) 275 in the case of a symbol "bin" wherein a generation probability distribution is close to a uniform distribution, while outputs the same to the context dependent type coding portion 274 in other cases where a symbol "bin" has a variable probability distribution.

A symbol "bin" subjected to the context independent type coding processing (bypass processing) is a part of a symbol string, etc. for expressing, for example, a positive or negative sign of a motion vector component, a positive or negative sign of a discrete cosine transform (DCT) coefficient, and values of a motion vector component and a DCT coefficient.

Specifically, the VLC 271 outputs as a symbol "bin" "1" when the motion vector component and the DCT coefficient have a negative sign and outputs "0" when a positive sign.

Also, when values of the motion vector component and the DCT coefficient exceed regulated values, specifically in the case of a content with much motions, that is a motion vector widely changes, and in the case of a high bit rate, that is when a large DCT coefficient arises, etc., the VLC 271 disassembles the syntax element SE to a prefix "Prefix" and a suffix "Suffix" by using the regulated value as a boundary.

Specifically, the VLC 271 performs Urany coding processing on the "Prefex" based on its size, and the switching portion 272 outputs respective symbols "bin" as the processing result to the context dependent type coding portion 274.

Also, the VLC 271 performs Exponential Golomb coding processing to the "Suffix" based on its size, and the switching portion 272 outputs respective symbols "bin" as the processing result to the context independent type coding portion 275.

In the context (CTX) 273, for example, an index indicating a transition state and MPS appearance probability pMPS are associated to be stored.

The index of the context (CTX) 273 is updated based on a signal S2741 indicating processing results of the context dependent type coding portion 274. Specifically, in the context (CTX) 273, the index is updated to increase the appearance probability of "1", for example, when a value coded based on the signal S2741 is "1", while the index is updated to increase the appearance probability of "0", for example, when a coded value is "0".

Due to this, in the CTX 273, appearance probability becomes close to that depending on the input SE.

The context dependent type coding portion 274 performs context dependent type coding processing based on the index by the context CTX 273 and the symbol "bin" to be encoded, and outputs a signal S2741 indicating an output result to the context CTX 273.

Also, the context dependent type coding portion 274 outputs a signal S274 indicating the processing result to the end processing portion 276.

The context independent type coding portion (Bypass) 275 performs context independent type coding processing based on a signal output from the switching portion 272, and outputs a signal S275 indicating the processing result to the end processing portion 276.

The end processing portion 276 outputs a code in accordance with the signal S274 or S275 to a bit stream.

Figure 6:
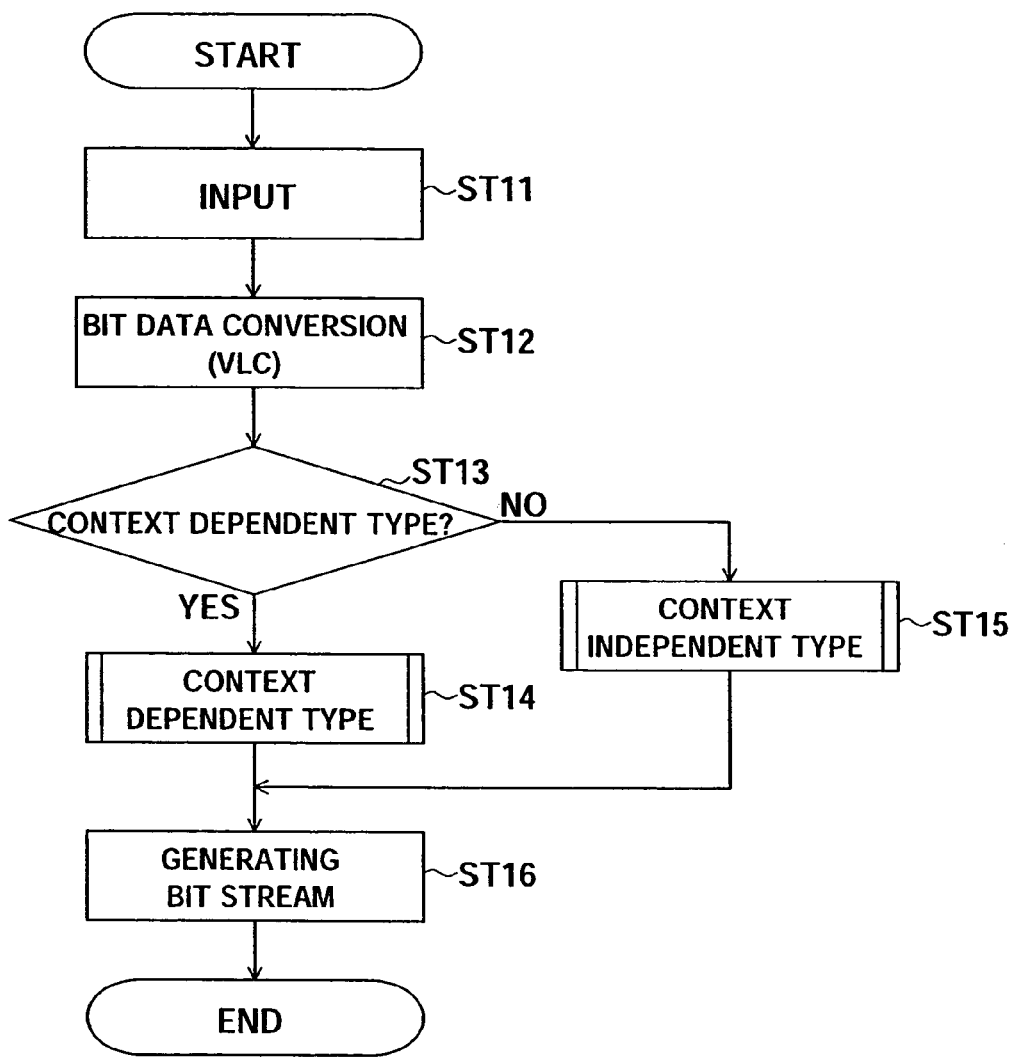
FIG. 6 is a flowchart of an overall operation of coding processing of the coding circuit shown in FIG. 2.

FIG. 6 is a flowchart of an overall operation of coding processing of the coding circuit shown in FIG. 2.

In step ST11, the VLC 271 converts an SE input, for example, from the quantization circuit 26 or motion prediction/compensation circuit 39 to a symbol "bin"string (bit data) by the VLC and fixed length coding, and outputs the same as a signal S271 (ST12).

In a step ST13, the switching portion 272 determines which of context dependent type coding processing and context independent type coding processing should be performed on the symbol "bin" as an input signal S271, and outputs a signal S271 to either of the context dependent type coding portion 274 and the context independent type coding portion 275 in accordance with the determined result.

In a step ST13, when the switching portion 272 determines that the symbol "bin" is a content dependent type, the context dependent type coding processing is performed (ST14).

Specifically, the context (CTX) 273 updates the index based on a signal S2741 indicating a processing result of the context dependent type coding portion 274, and assigns appearance probability for respective symbols "bin".

The context dependent type coding portion 274 performs context dependent type coding processing based on the index by the context CTX 273 and the symbol "bin" to be encoded, and outputs a signal S2741 indicating the output result to the context CTX 273.

On the other hand, in the step ST13, when the switching portion 272 determines that the symbol "bin" is a context independent type, context independent type coding processing is performed (ST15).

Specifically, the context independent type coding portion (Bypass) 275 performs context independent type coding processing based on a signal output from the switching portion 272, and outputs a signal S275 indicating the processing result to the end processing portion 276.

In a step ST16, the end processing portion 276 generates a code in accordance with the signal S274 or S275 and outputs the same to a bit stream.

Figure 7:
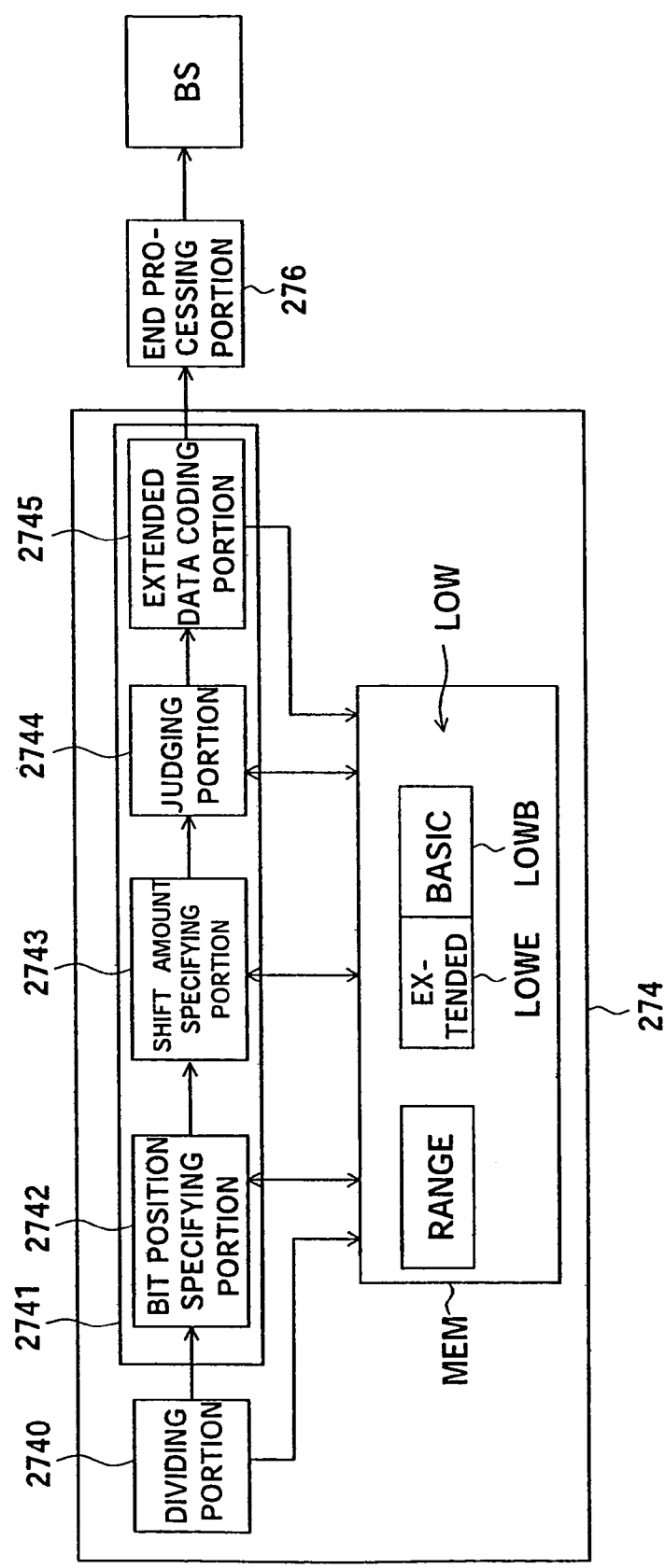
FIG. 7 is a block diagram of a function of the coding circuit shown in FIG. 5.

FIG. 7 is a block diagram of a function of the coding circuit shown in FIG. 5.

The context dependent type coding portion 274 performs a left shift operation successively on a "Range" and a lower limit value "Low" until the "Range" exceeds a predetermined value, and generates coding data in accordance with the "Range" value before performing the left shift operation.

The context dependent type coding portion 274 comprises, for example as shown in FIG. 7, a memory MEM, a dividing portion 2740, and a normalizing portion 2741. The normalizing portion 2741 comprises a shift amount specifying portion 2743, a judging portion 2744 and an extended data coding portion 2745.

The bit position specifying portion 2742 corresponds to a bit position specifying means according to the present invention, the shift amount specifying portion 2743 corresponds to a shift amount specifying means according to the present invention, the judging portion 2744 corresponds to a judging means according to the present invention, and the extended data coding portion 2745 corresponds to a coding means according to the present invention.

The dividing portion 2740 divides a section at a ratio in accordance with generation probability of a symbol "bin" based on the input symbol "bin" for performing arithmetic coding processing, for example as shown in FIG. 3, selects the divided sections based on the symbol "bin", and updates a later explained "Range" indicating a size of the section and a lower limit value "Low" of the section.

Figure 8:
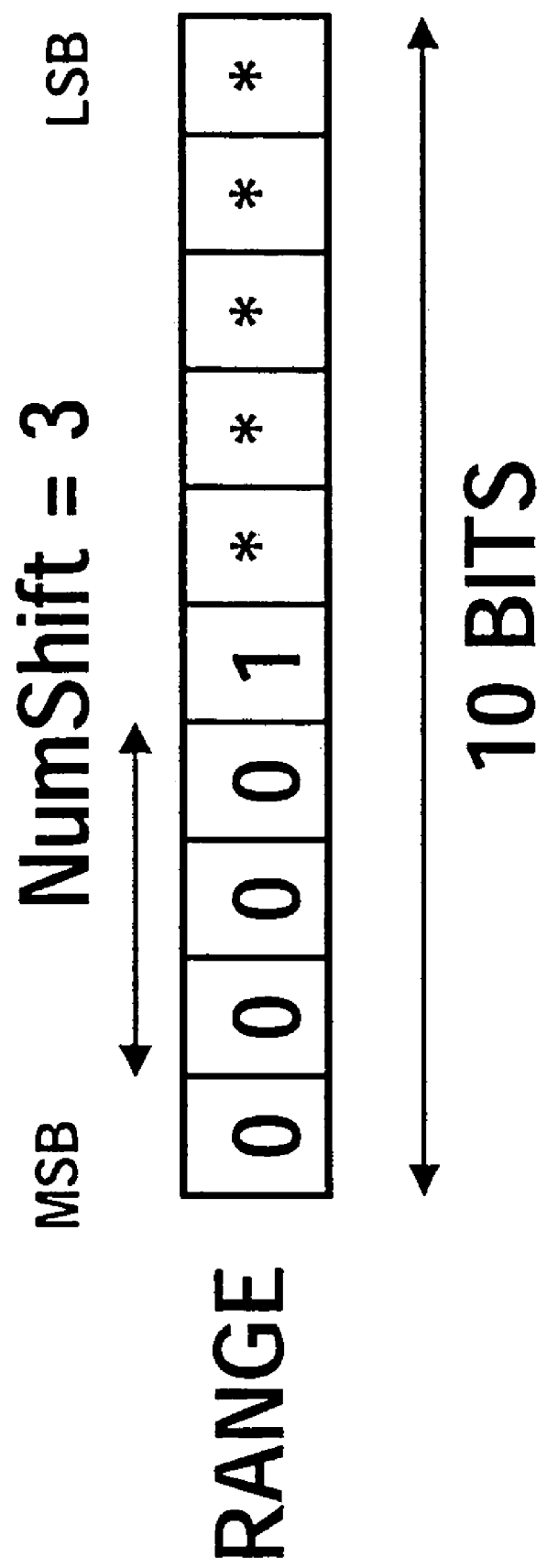
FIG. 8 is a view for explaining range "Range" data of the coding circuit shown in FIG. 7.
Figure 9:
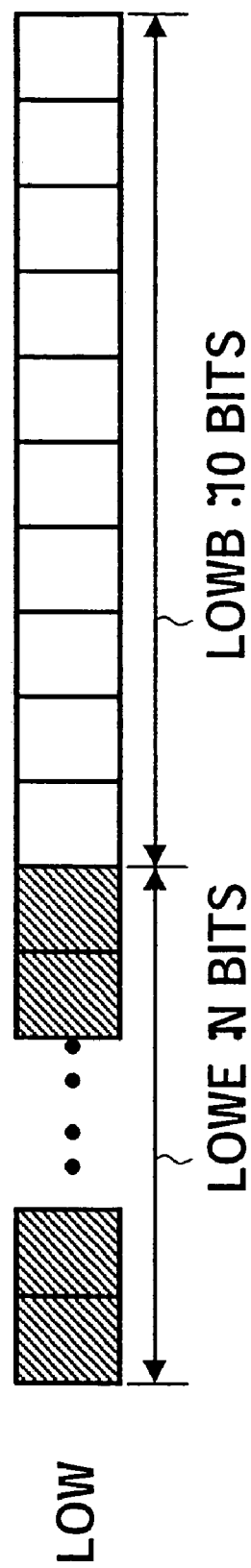
FIG. 9 is a view for explaining lower limit value "Low" data of the coding circuit shown in FIG. 7.

FIG. 8 is a view for explaining "Range" data of the coding circuit shown in FIG. 7. FIG. 9 is a view for explaining lower limit value "Low" data of the coding circuit shown in FIG. 7.

In the present embodiment, the memory MEM stores the "Range" and lower limit value "Low" data.

The "Range" indicates a size of a section in the above explained arithmetic coding processing, and has a predetermined bit length of data region, for example, a 10-bit length of data region as shown in FIG. 8.

The lower limit value "Low" is data indicating a section in the above arithmetic coding processing and specifically indicates a lower limit value "Low" of the section.

The lower limit value "Low" according to the present embodiment has basic region data "LowB" and extended region data (also referred to as extended data) "LowE", for example as shown in FIG. 9.

The basic region data "LowB" is data indicating a general lower limit value "Low" and has, for example, a 10-bit length of data region as shown in FIG. 9.

The extended region data "LowE" is data added to the highest-order bit (MSB) side of the basic region data "LowB" of the lower limit value "Low", wherein the bit data is carried from the lower limit value "Low" by a left shift operation, and has a predetermined bit length, for example as shown in FIG. 9, an N-bit length data region.

The "Range" corresponds to first data according to the present invention, the lower limit value "Low" corresponds to second data according to the present invention, and the extended region data "LowE" corresponds to extended data according to the present invention.

The normalizing portion 2741 performs normalizing processing for extending the "Range" to be larger than a predetermined value for maintaining calculation accuracy in the arithmetic coding processing. Below, each component in the normalizing portion 2741 will be explained.

The bit position specifying portion 2742 specifies a bit position indicating a first logic value close to the MSB of the "Range" based on the "Range" in the memory MEM.

Specifically, the bit position specifying portion 2742 specifies a bit position indicating a first logic value being closest to the MSB, "1" in the present embodiment when the "Range" value is, for example, "00001*****" as shown in FIG. 8.

A shift amount specifying portion 2743 specifies a shift amount "NumShift" immediately before the "Range" exceeds the predetermined value due to the left shift operation based on a bit position specified by the bit position specifying portion 2742.

Specifically, the shift amount specifying portion 2743 specifies a shift amount "NumShift" immediately before the "Range" exceeds a predetermined value, for example 0×100, by a left shift operation as "3" based on a bit position specified by the bit position specifying portion 2742 as shown in FIG. 8.

A method of specifying the shift amount "NumShift" is not limited to the above embodiment.

For example, the bit position specifying portion 2742 and the shift amount specifying portion 2743 may perform an operation shown in the formula (1) and specify the shift amount "NumShift" from the operation result. Here, "Range<<=1" means to perform a left shift operation by one bit, and "NumShift++" means to increment by 1.

[Formula 1]

```
Int NumShift=0;
While(Range < 0x100){
    Range<<=1;
    NumShift++;
}
```

Also, for example, the bit position specifying portion 2742 and the shift amount specifying portion 2743 may specify a shift amount "NumShift" by performing an operation of "NumShift=9−P" on a bit position "P" (>=1) obtained by counting from the least significant bit (LSB) "1" existing on the leftmost (MSB) side in a bit string of the "Range". When performing a function according to the present invention by a processor having an order to obtain "P", the shift amount "NumShift" can be easily specified by using this method.

The judging portion 2744 determines whether or not a free space exceeding the shift amount specified by the shift amount specifying portion 2743 exists in a predetermined bit length of extended region data being added to the MSB side of the lower limit value "Low", wherein bit data is carried from the lower limit value "Low" by a left shift operation.

When the judging portion 2744 determines that there is a free space exceeding the shift amount specified by the shift amount specifying portion 2743 in the extended region data "LowE", a left shift operation is performed on the lower limit value "Low" and "Range". Specifically, bits in a basic region data "LowB" are subjected to a left shift operation exactly by the shift amount "NumShift" into the extended range "LowE".

When the judging portion 2744 judges that there is no free space, the extended data coding portion 2745 generates coding data of data stored in the extended region data "LowE" by a left shift operation. Namely, the extended data coding portion 2745 generates coding data when the extended region data "LowE" no longer has room for storing bits.

The configuration of the context dependent type coding portion 274 was explained above, and the context independent type coding portion 275 also has approximately the same configuration and provides extended region data "LowE" in the lower limit value "Low" and performs coding processing on data in the extended region data "LowE" at a time as explained above.

A different point between the Bypass 275 and the context dependent type coding portion 274 is that the context dependent type coding portion 274 does not use the context CTX. Namely, in the context-dependent type coding processing, the appearance probability is a preset fixed value and the "Range" is also fixed.

Figure 10:
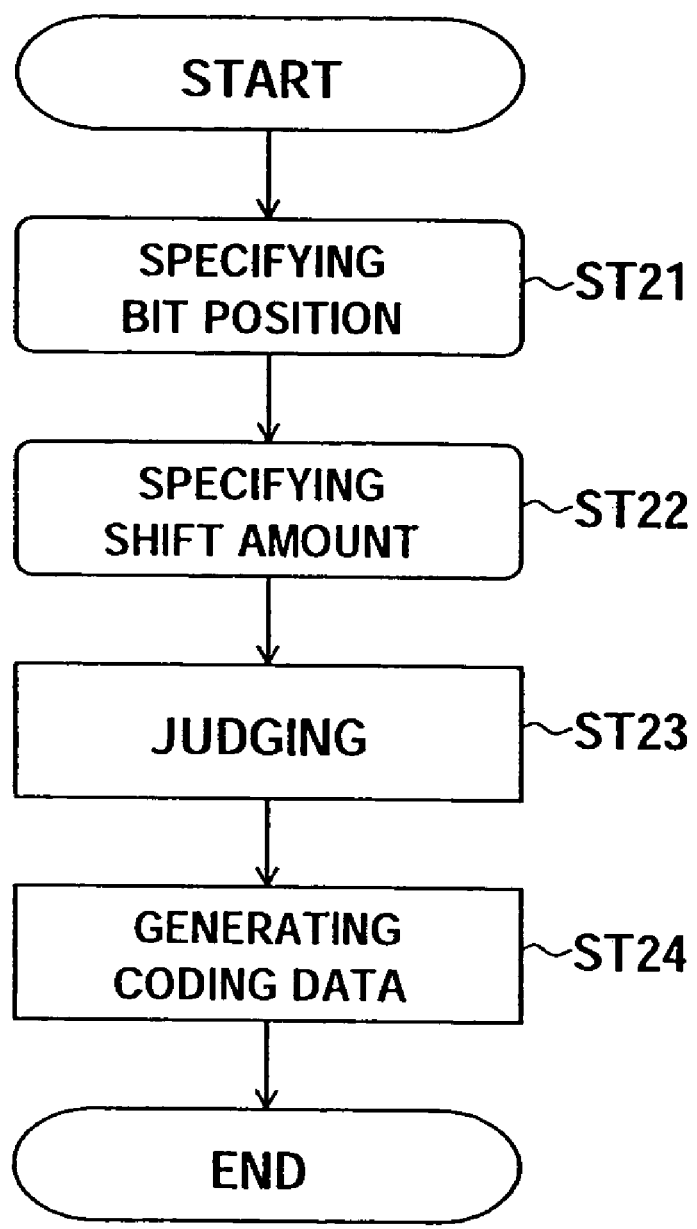
FIG. 10 is a flowchart for explaining an operation of coding processing of a coding circuit shown in FIG. 7.

FIG. 10 is a flowchart for explaining an operation of coding processing of the coding circuit shown in FIG. 7.

With reference to FIG. 10, an operation of the context dependent type coding portion 274 and the context independent type coding portion 275 will be explained by focusing on the normalizing processing.

First, to perform arithmetic coding processing as shown in FIG. 3, the dividing portion 2740 divides a section by a ratio in accordance with generation probability of a symbol "bin" based on the input symbol "bin", selects the divided section based on the symbol "bin", and updates the "Range" indicating a later explained section size and the lower limit value "Low".

The normalizing portion 2741 performs normalizing processing for extending at least the "Range" to be larger than a predetermined value to maintain calculation accuracy in the arithmetic coding processing.

Specifically, in a step ST21, the bit position specifying portion 2742 specifies a bit position indicating a first logic value being closest to the MSB of the "Range" based on the "Range" in the memory MEM as a result of dividing by the dividing portion 2740.

In a step ST22, the shift amount specifying portion 2743 specifies a shift amount "NumShift" immediately before the "Range" exceeds a predetermined value by a left shift operation based on the bit position specified by the bit position specifying portion 2742.

In a step ST23, the judging portion 2744 determines whether or not a free space exceeding the shift amount specified by the shift amount specifying portion 2743 exists in a predetermined bit length of extended region data "LowE" being added to the MSB side of the lower limit value "Low", wherein bit data is carried from the lower limit value "Low" by a left shift operation. When the judging portion 2744 determines that there is a free space exceeding the shift amount "NumShift" in the extended region data "LowE", a left shift operation is performed on the lower limit value "Low" and "Range". Specifically, bits in a basic region data "LowB" are subjected to a left shift operation by the shift amount "NumShift" into the extended range "LowE".

In a step ST24, when the judging portion 2744 judges that there is no free space, the extended data coding portion 2745 generates coding data of data stored in the extended region data "LowE" by a left shift operation.

As explained above, in the present embodiment, as a result that the coding portions 274 and 275 for successively performing a left shift operation on the "Range" and the lower limit value "Low" until the "Range" exceeds a predetermined value and generating coding data in accordance with the lower limit value "Low" before performing the left shift operation, are provided with a bit position specifying portion 2742 for specifying a bit position indicating a first logic value being closest to the MSB in the "Range"; a shift amount specifying portion 2743 for specifying a shift amount "NumShift" immediately before the "Range" exceeds the predetermined value by a left shift operation based on the bit position specified by the bit position specifying portion 2742; a judging portion 2744 for determining whether or not there is a free space exceeding the shift amount "NumShift" determined by the shift amount specifying portion 2743 in a predetermined bit length of extended region data "LowE" added to the MSB side of the lower limit value "Low", wherein bit data is carried from the lower limit value "Low" by a left shift operation; and an extended data coding portion 2745 for generating coding data of data stored in the extended region data "LowE" by the left shift operation when the judging portion 2744 determines there is no free space; it is possible to attain a high speed and a reduction of a computation amount in the coding processing.

Specifically, while coding processing is performed in unit of one bit in general coding apparatuses, in the present embodiment, as a result of being input from the basic region data "LowB" by a left shift operation, being provided with a predetermined bit length of extended region data "LowE", and coding data in the extended region data "LowE" at a time, branch processing and computation amount can be reduced and the coding processing can be performed at a high speed.

Figure 11:
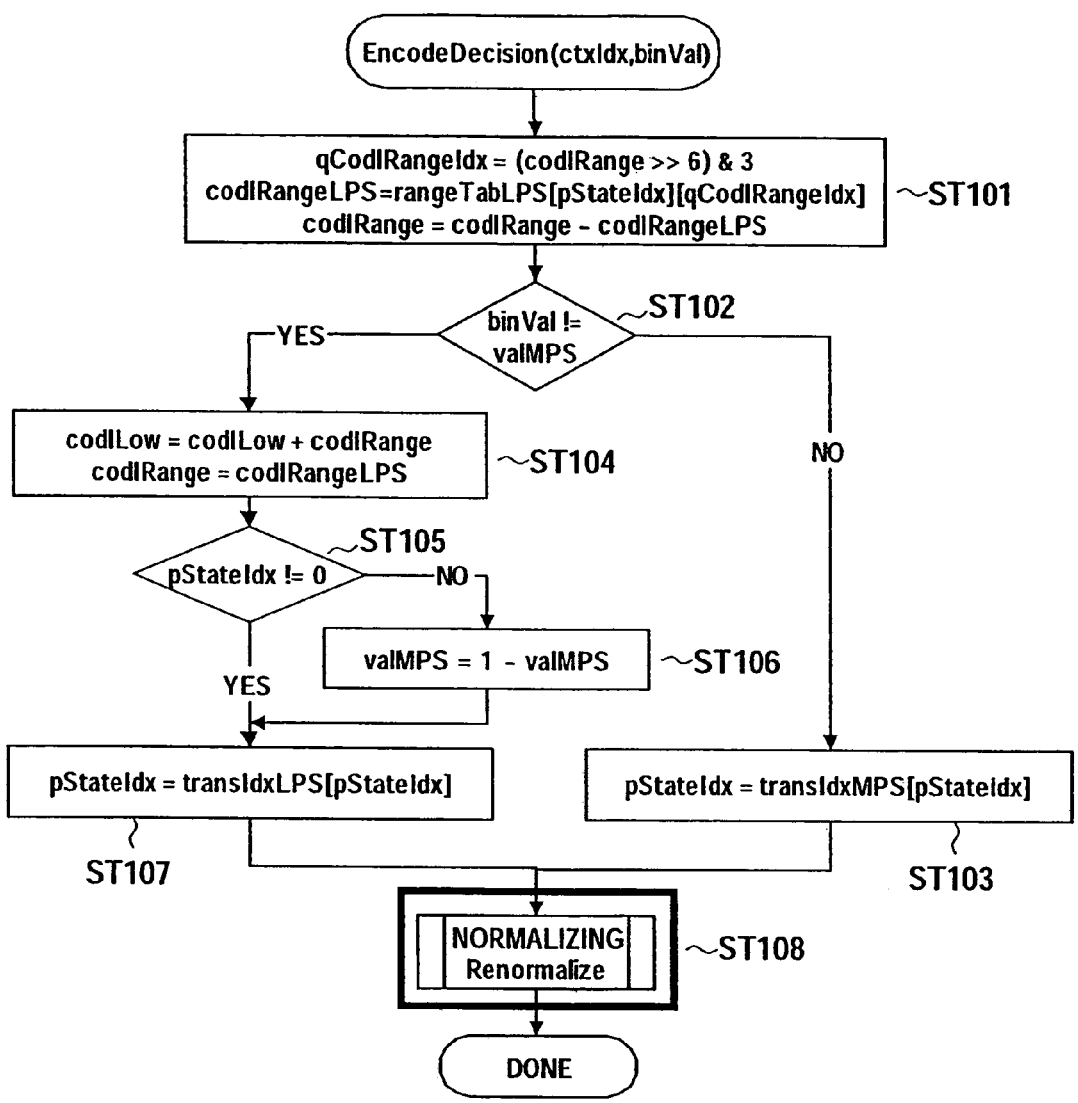
FIG. 11 is a flowchart for explaining a specific example of an operation of coding processing of the coding circuit shown in FIG. 7.
Figure 12:
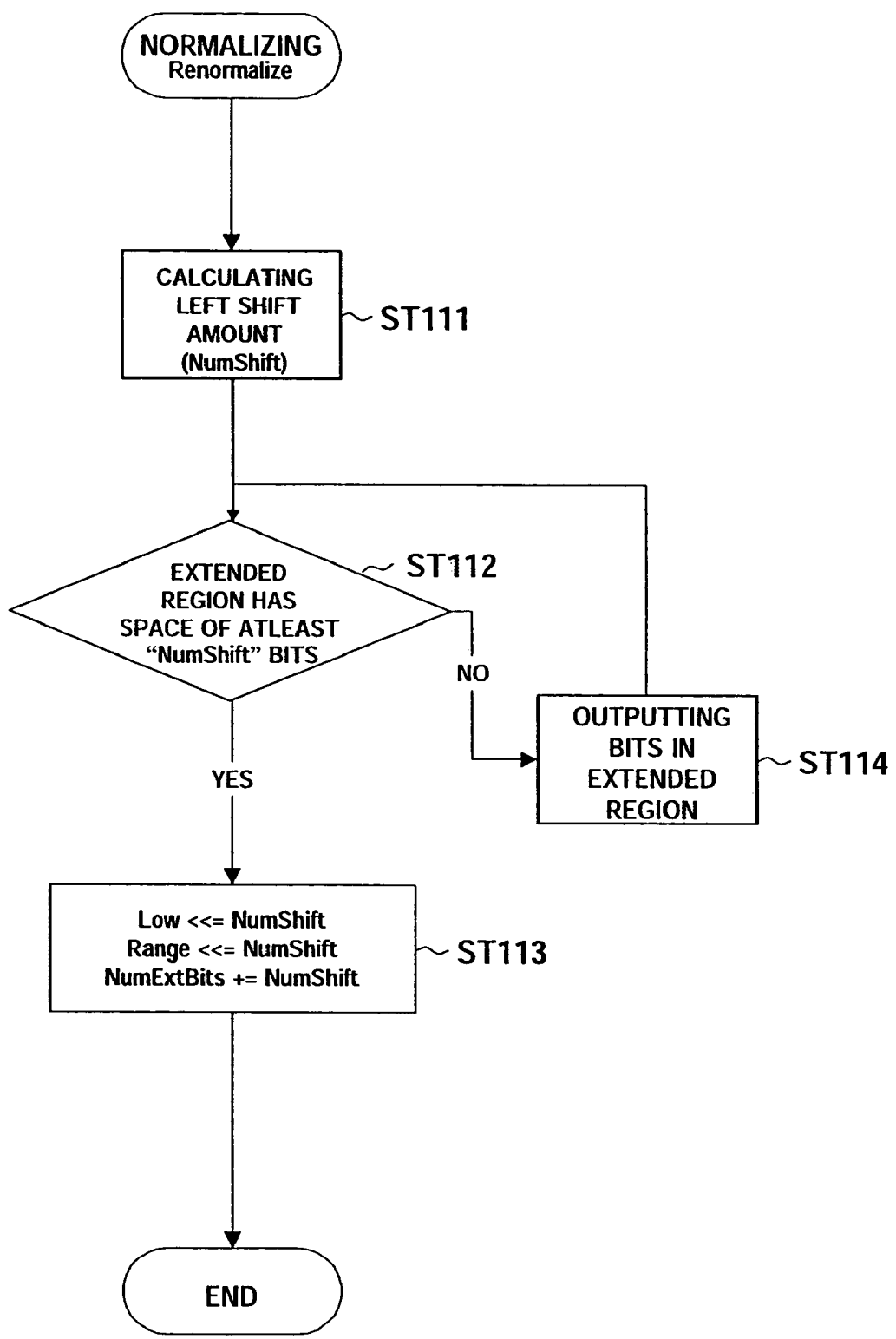
FIG. 12 is a flowchart for explaining a specific example of normalizing processing of the coding circuit shown in FIG. 11.

FIG. 11 is a flowchart for explaining a specific example of an operation of coding processing in the coding circuit shown in FIG. 7. FIG. 12 is a flowchart for explaining a specific example of normalizing processing of the coding circuit shown in FIG. 11. With reference to FIG. 11 and FIG. 12, a specific example of coding processing of a coding circuit will be plainly explained by focusing on processing of the context dependent type coding portion 274.

The context dependent type coding portion 274 performs coding processing by using index "ctxIdx" of a specified context and a symbol "binVal" to be encoded as inputs.

The "codIRange" and "codILow" indicate a probability range ("Range") and a lower limit value "Low". These values are used in common in any of context/context independent type AC. The context CTX is managed by the index "ctxIdx", and each context is assigned "valMPS" and "pStateIdx" indicating the MPS value and a transition state number.

In a step ST101, the dividing portion 2740 quantizes a "codIRange" value to a value called "qCodIRangeIdx", uses a regulated table value "rangeTabLPS" to obtain a probability width "codIRangeLPS" of the LPS. It also changes the "codIRange" to a probability width of the MPS.

In a step ST102, the dividing portion 2740 branches the processing based on whether the input symbol "bin" is the MPS or not. When the symbol is MPS, the state is transited by the table value "transIdxMPS" regulated in the standard and the "pStateIdx" is updated (ST103).

On the other hand, in a step ST103, when the input symbol "bin" is the LPS, the "codILow" value and the "codIRange" are updated.

Specifically, a value obtained by adding the "codLow" and "codIRange" is substituted in the "codILow", and the "codIrangeLSP" is substituted to the "codIRange" (ST104).

In a step ST105, it is determined whether the "pStateIdx" is "0" or not and, when the "pStateIdx" is "0", "1−valMPS" is substituted to the "valMPS" (ST106) and the procedure proceeds to processing in a step ST107. In the step ST105, the procedure also proceeds to processing of the step ST107 when the "pStateIdx" is not "0" in the step ST105.

In a step ST107, the "pStateIdx" is updated.

In a step ST108, the normalizing portion 2741 performs normalizing processing (Renormalize) for performing a left shift operation until the "codIRange" value becomes a predetermined value or larger. An output bit (string) is determined in accordance with the "codILow" value.

In the normalizing processing, as shown in FIG. 12, the bit position specifying portion 2742 and the shift amount specifying portion 2743 calculate a left shift amount "NumShift" based on the "codIRange" (Range) in a step ST111 as shown in FIG. 9.

In a step ST112, the judging portion 2744 performs a left shift operation on the lower limit value "Low" when an extended region has a room, and bits of basic region data "LowB" is shifted into the extended region data "LowE" (ST113). Specifically, the lower limit value "Low" is subjected to a left shift operation exactly by the shift amount "NumShift", the "Range" is subjected to a left shift operation exactly by the shift amount "NumShift", and the bit number "NumExtBit" stored in the extended region data "LowE" is added with the shift amount "NumShift" to update.

On the other hand, in the step ST112, when it is judged that there is no free space in the extended region data "LowE", the extended data coding portion 2745 generates coding data based on the extended region data "LowE" and the procedure returns back to the processing in the step ST112.

As explained above, the coding circuit according to the present embodiment performs coding data in the extended region data "LowE", not in unit of one bit, so that the arithmetic processing is performed at a high speed and it is possible to output the same coding data as that output by a general coding apparatus.

A coding circuit according to a second embodiment of the present invention has approximately the same configuration as that of the coding circuit shown in FIG. 7 and comprises a memory MEM, a dividing portion 2740 and a normalizing portion 2741. The normalizing portion 2741 comprises a bit position specifying portion 2742, a shift amount specifying portion 2743, a judging portion 2744 and an extended data coding portion 2745.

A different point is a function of the judging portion 2744 and that of the extended data coding portion 2745. An explanation will be made only on the different point.

The judging portion 2744 determines whether or not preset bit length of data exists in the extended region data "LowE" added to the MSB side of the lower limit value "Low", wherein bit data is carried from the lower limit value "Low" by a left shift operation.

For example, the judging portion 2744 determines whether or not bit data in unit of integral multiple of byte is stored in the extended region data "LowE".

When it is judged that a preset bit length of data is in the extended region data "LowE", the extended data coding portion 2745 generates coding data of data stored in the extended region data "LowE" by a left shift operation.

Only a different point of the above configured operation will be plainly explained.

The judging portion 2744 judges whether or not the extended region data "LowE" stores bit data in unit of integer multiple of byte and, when it is judged that the extended region data "LowE" has a preset bit length of data, the extended data coding portion 2745 generates coding data of data stored in the extended region data "LowE". In other cases than the above, bits in the basic region data "LowE" are subjected to a left shift operation into the extended region "LowE" exactly by a shift amount "NumShift".

As explained above, in the present embodiment, as a result that the judging portion 2744 for determining whether a preset bit length of data exists in the extended region data "LowE" added to the MSB side of the lower limit value "Low", wherein bit data is carried from the lower limit value "Low" by a left shift operation; and an extended data coding portion 2745 for generating coding data of data stored in the extended region data "LowE" by a left shift operation when it is judged that the preset bit length of data is in the extended region data "LowE"; coding can be performed in unit of optimal byte, and arithmetic processing can be performed at a higher speed.

Also, when determining an output bit, carryover of the coding circuit is considered.

Figure 13:
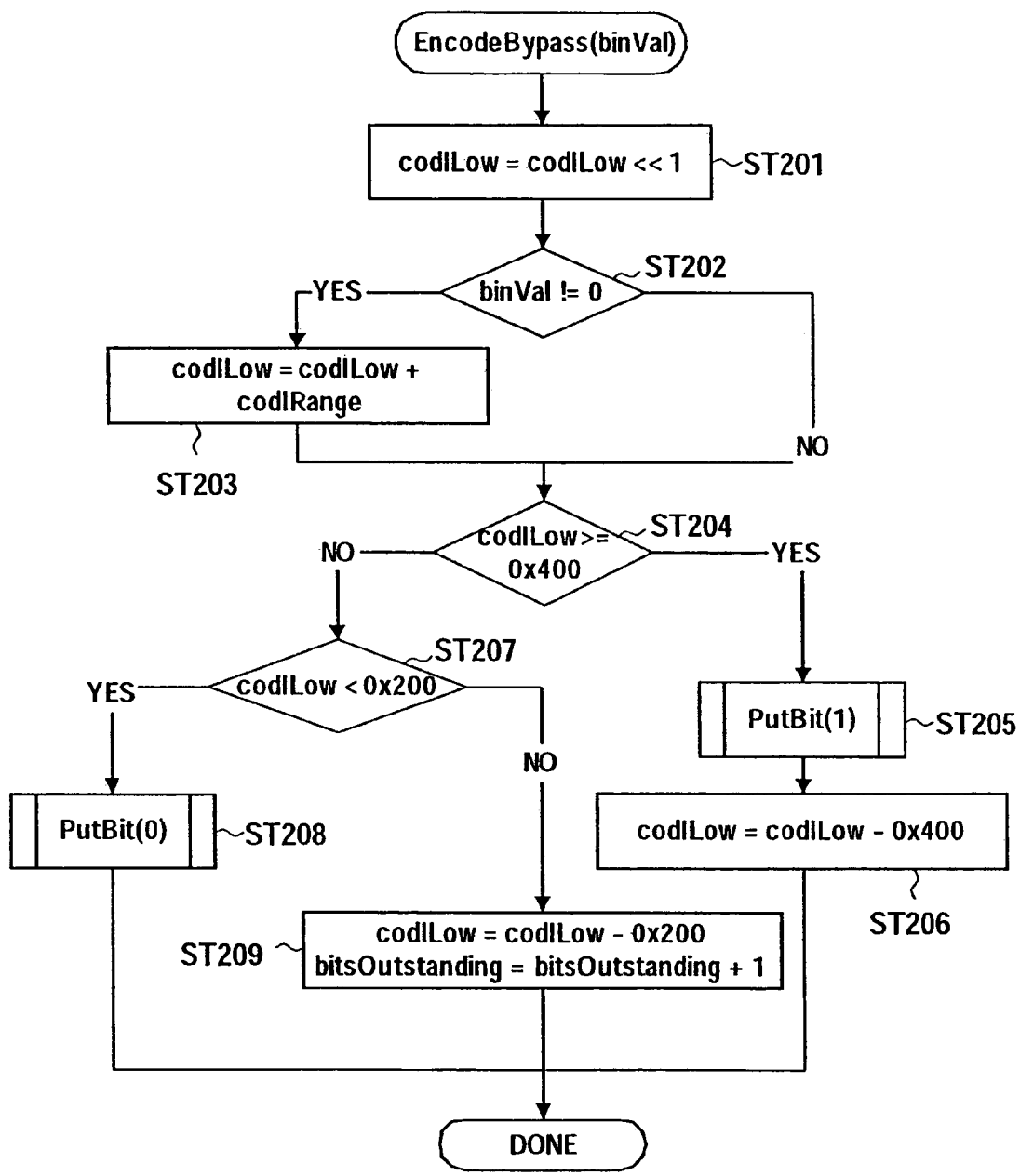
FIG. 13 is a view for explaining a specific example of an operation of a context independent type coding portion shown in FIG. 5.

FIG. 13 is a view for explaining a specific example of an operation of the context-independent type coding portion shown in FIG. 5.

In a step ST201, the context independent type coding portion (Bypass) 275 performs a left shift operation on the "codILow" (lower limit value "Low") by one bit.

In a step ST202, the bypass 275 adds "CodIRange" to the "codILow" and substitutes the result to the "codILow" (ST203), and the procedure proceeds to a step ST204 when the symbol "bin" (bin Val) is not "0". On the other hand, when the symbol "bin" (bin Val) is "0", the procedure proceeds to a step ST204.

In a step ST204, it is determined whether the "codILow" is a predetermined value, for example, 0×400 or larger or not and, when the "codILow" is 0×400 or larger, later explained processing of "PutBit(1)" is performed (ST205), and a value obtained by subtracting 0×400 from the "codILow" is substituted to the "codILow".

On the other hand, in a step ST204, when the "codILow" is smaller than 0×400, whether it is smaller than 0×200 or not is determined (ST207). When the "codILow" is smaller than 0×200, later explained processing of "PutBit(0)" is performed (ST208). On the other hand, when the "codILow" is 0×200 or more, a value obtained by subtracting 0×200 from the "codLow" is substituted to the "codLow", and a value of "bitOutstanding" as a variable as measures to carryover is incremented by one (ST209).

Figure 14:
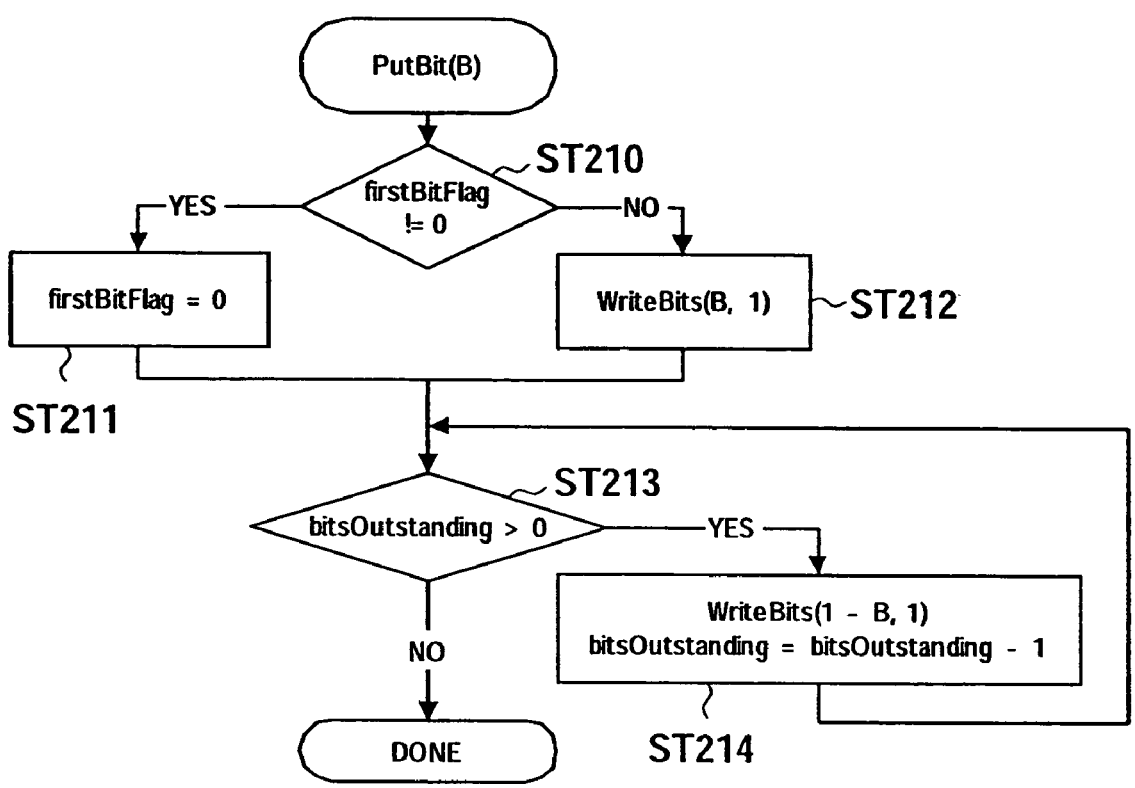
FIG. 14 is a flowchart for explaining processing of "PutBit(B)" of the coding processing shown in FIG. 13.

FIG. 14 is a flowchart for explaining processing of "PutBit(B)" of the coding processing shown in FIG. 13. With reference to FIG. 14, an operation of the "PutBit(B)" in the steps ST205 and ST208 of the bypass 275 will be explained.

When outputting a coding bit in a step ST210, the bypass 275 determines whether it is the first bit. A "firstbitFlag" indicating the first bit is used for determining this. When the "firstbitFlag" is not "0", it indicates being the first bit, while when the "firstbitFlag" is "0", it indicates being not the first bit.

In detail, the bypass 275 substitute "0" to the "firstbit-Flag" and does not output the first bit when the "firstbitFlag" is not "0" in the step ST210.

On the other hand, when the "firstbitFlag" is "0", the bypass 275 performs processing of "WriteBits(B, 1)" in the step ST210. Here, the "WriteBits(B, 1)" is processing to output one bit length of value "B".

In a step ST213, the bypass 275 determines whether the "bitsoutstanding" is larger than "0" or not and, when it is determined to be larger than "0", processing of "WriteBits (1−B, 1)" is performed, "1" is subtracted from the "bitOutstanding" and the procedure returns back to the processing in the step ST213. Here, processing of "WriteBits(1−B, 1) is to output a complement of one bit length of B.

On the other hand, in the step ST213, the bypass 275 suspends a string of processing when the "bitOutstanding" is determined to be "0" or less.

By performing the operation explained above, the bypass is capable of performing coding processing without causing carryover.

In context independent type coding processing, the context independent type coding portion 275 according to a third embodiment of the coding circuit of the present invention attains higher speed computation by coding continuous symbols "bin" to be encoded at a time when the symbols "bin" to be subjected to context independent type coding processing is continuously input in consideration of a characteristic that the "Range" value does not change by normalizing.

Specifically, it is assumed that a symbol string to be encoded is B=(b0 b1 b2 b3 . . . bn), and the coding order is b0, b1, . . . , bn.

A result of repeating the context independent type coding processing (Bypass) of the above explained embodiment on each "bm(0<=m<=n)" for "Length(B)" times is equal to the lower limit value "Low" obtained by performing computation shown in the formula (2).

Low=Low<<Length(*B*)+Range*Value(*B*) NumExt-Bits+=Length(*B*) [Formula 2]

Proof of the formula 2 will be explained below.

It is assumed that a certain element value N has arrangements of A={A[0], A[1], . . . , A[N−1]} and B={B[0], B[1], . . . , B[N−1]}. The "A" and "B" can be expressed by the recurrence formula below.

[Formula 3]

$$A[n+1]=2\cdot A[n]+B[n]\cdot C \quad (3)$$

At this time, it will be proved by the mathematical inductive method that the "A[n]" in the formula (3) can be expressed by the formula (4).

[Formula 4]

$$A[n] = 2^n \cdot A[0] + \left(\sum_{i=0}^{n-1} B[i] \cdot 2^{n-1-i}\right) \cdot C \quad (4)$$

(A): When "n=0" in the formula (4), both sides of the equation become A[0].

(B): When "n=k" in the formula (4), it is assumed that the formula (5) stands.

[Formula 5]

$$A[k] = 2^k \cdot A[0] + \left(\sum_{i=0}^{k-1} B[i] \cdot 2^{k-1-i}\right) \cdot C \quad (5)$$

At this time, from the formula (3), the formula (5) is substituted to "A[k]" on the right-hand side of the formula (6).

[Formula 6]

$$A[k+1]=2\cdot A[k]+B[k]\cdot C \quad (6)$$

[Formula 7]

$$A[k+1] = 2 \cdot A[k] + B[k] \cdot C \quad (7)$$
$$= 2\left(2^k \cdot A[0] + \left(\sum_{i=0}^{k-1} B[i] \cdot 2^{k-1-i}\right) \cdot C\right) + B[k] \cdot C$$
$$= 2^{k+1} \cdot A[0] + \left(\sum_{i=0}^{k} B[i] \cdot 2^{k-i}\right) \cdot C$$

As a result of the above substitution, the formula (7) was obtained, and it was proved that the formula (4) stood also in the case of "n=k+1".

From the (A) and (B), it was proved that the formula (4) stood for any "n". (Q.E.D.)

Now, it is assumed that a symbol string to be encoded is B=(b0 b1 b2 b3 . . . bn), and the coding order is b0, b1, . . . , bn.

When assuming that a value of "Low" immediately before encoding a symbol "bk" is A[k], and a value of "bk" is b[k], a value of "Low" after performing processing on the "bk", that is A[k+1], becomes as the formula (8) from the above formula (4).

[Formula 8]

$$A[k+1] = 2^{k+1} \cdot A[0] + \left(\sum_{i=0}^{k} B[i] \cdot 2^{k-i}\right) \cdot C \quad (8)$$

When replacing by the formula (9) in the case of "k=n", the value of "Low" after coding "B" is the same as the formula (10).

Here, "Length(S)" is a length of the symbol string "S", and "Value(S)" is a value by assuming the symbol string "S" as a binary.

Specifically, for example, when the symbol string is {0, 1, 0}, the value(S) is $0\times 2^2+1\times 2^1+0\times 2^0=2$. Even when a bit length is long, the symbol string is assumed to be binary data to calculate the value(S) in the same way.

[Formula 9]

$$\text{Length}(B) = n + 1 \quad (9)$$
$$\text{Value}(B) = \sum_{i=0}^{n} B[i] \cdot 2^{n-i}$$
$$\text{Range} = C$$

$$\text{Low}=\text{Low}<<\text{Length}(B)+\text{Range}*\text{Value}(B) \quad \text{[Formula 10]}$$

The above processing is equal to the result of performing the normalizing processing "Renormalize" explained above. Namely, by not performing the processing sequentially on each "bin" of a symbol string, it becomes possible to perform coding on the symbol string at a time.

Below, the specific configuration of the context-independent type coding portion according to the present embodiment will be explained.

Figure 15:
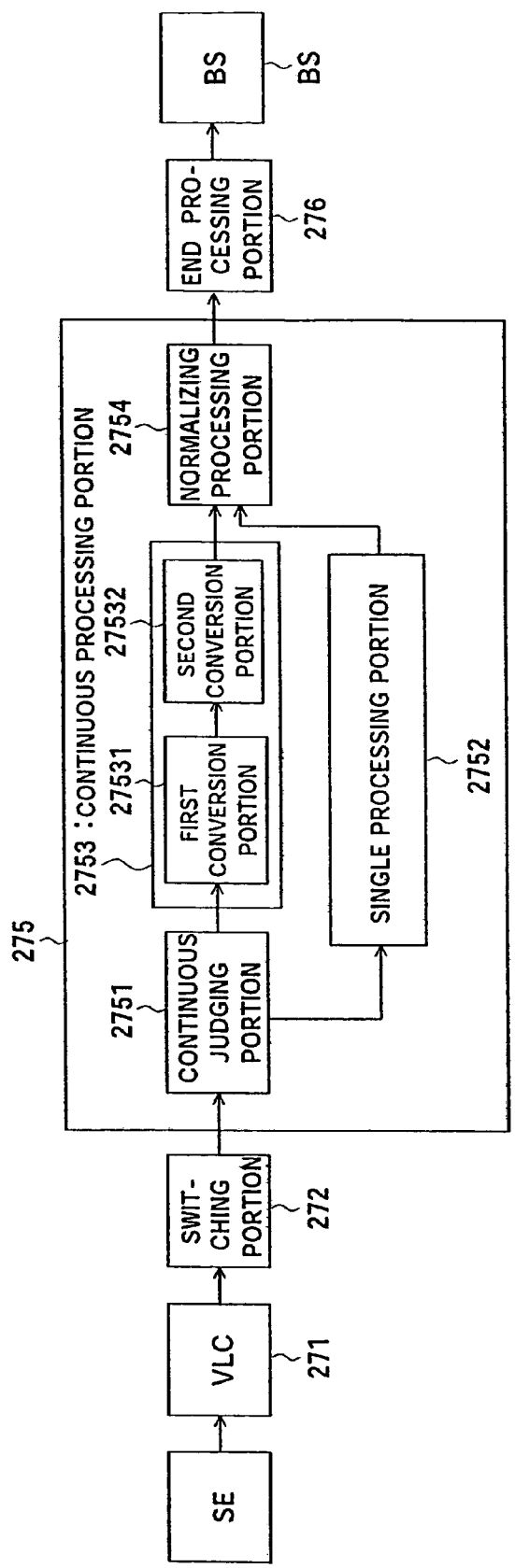
FIG. 15 a block diagram of a function of a context independent type coding portion according to a third embodiment of the coding circuit of the present invention.

FIG. 15 is a block diagram of a function of the context independent type coding portion according to the third embodiment of the coding circuit of the present invention.

The context independent type coding portion 275 according to the present embodiment comprises, for example as shown in FIG. 15, a continuous judging portion 2751, a single processing portion 2752, continuous judging portion 2753, and a normalizing portion 2754.

The continuous judging portion 2751 corresponds to the detection means according to the present invention. The single processing portion 2752 corresponds to the context independent type coding portion 275 according to the first embodiment. The normalizing portion 2754 corresponds to the normalizing portion 2741 according to the first embodiment. An explanation will be made only on different points from those in the above embodiments.

The continuous judging portion 2751 detects whether continuous bit data to be encoded is context independent type having a characteristic of being capable of performing coding processing with the "Range" fixed. When it is judged to be not continuous, the continuous judging portion 2751 makes the single processing portion 2752 perform normal context independent type coding processing.

When the continuous judging portion 2751 detects that the continuous bit data is context independent type, the continuous processing portion 2753 performs coding processing on the continuous bit data at a time and outputs the processing result to the normalizing portion 2754.

The continuous processing portion 2753 comprises, as shown in FIG. 15, a first conversion portion 27531 and a second conversion portion 27532.

The first conversion portion 27531 corresponds to a conversion means according to the present invention.

When the continuous judging portion 2751 detects that the continuous bit data is context independent type, the first conversion portion 27531 makes the continuous bit data be binary data, and uses as a new lower limit value "Low" a value obtained by adding a product of the binary data and a preset "Range" to a value obtained by performing a left shift operation exactly by a bit data length of the continuous bit data on the lower limit value "Low"; and adds the bit length of the continuous bit data to bits of an extended region data "LowE".

The second conversion portion 27532 adds a bit length of continuous bit data to a bit length of an extended region data and updates a bit length of the extended region data.

Figure 16:
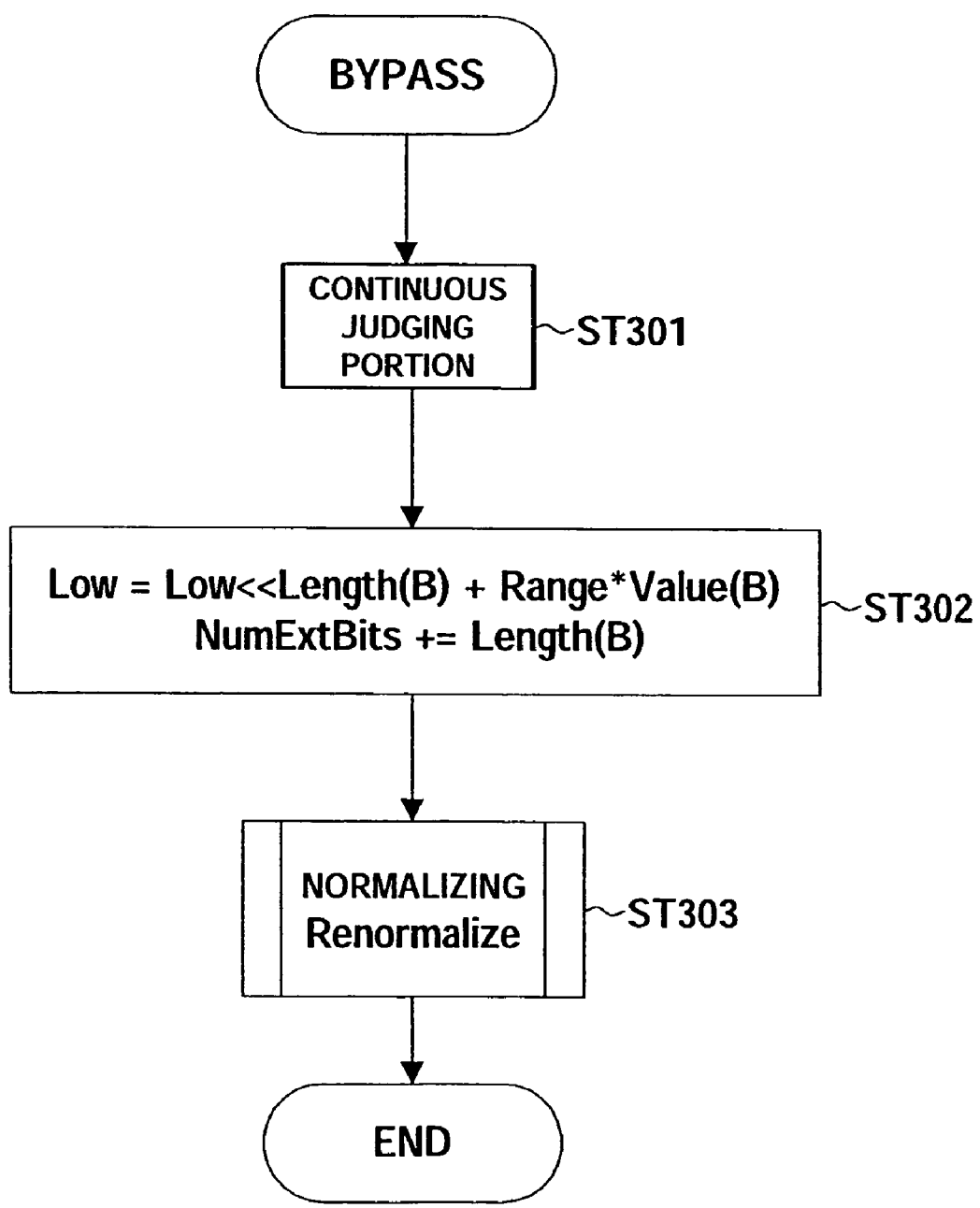
FIG. 16 is a view for explaining an operation of the context independent type coding portion of the coding circuit shown in FIG. 15.

FIG. 16 is a view for explaining an operation of the context independent type coding portion of the coding circuit shown in FIG. 15. With reference to FIG. 16, an operation of the context independent type coding portion 275 will be explained in the case of coding processing wherein continuous bit data to be encoded is input.

In a step ST301, the continuous judging portion 2751 detects whether continuous bit data to be encoded is context independent type having a characteristic of being capable of performing coding processing with a "Range" fixed.

In a step ST302, when the continuous judging portion 2751 detects that the continuous-bit data is context independent type, the first conversion portion 27531 makes the continuous bit data be binary data, and uses as a new lower limit value "Low" a value obtained by adding a product of the binary data and a preset "Range" to a value obtained by performing a left shift operation on the lower limit value "Low" exactly by a bit data length of the continuous bit data; and adds the bit length of the continuous bit data to bits of an extended region data "LowE".

The second conversion portion 27532 adds a bit length of continuous bit data to a bit length of an extended region data and updates a bit length of the extended region data.

In a step ST303, the normalizing portion 2754 performs the same normalizing processing as that by the normalizing portion 2741, for example, as shown in FIG. 12.

Also, at this time, a value for suppressing outputting of the first one bit carried by a left shift operation is set as an initial value of "NumExtBits" shown in FIG. 12, and outputting of the first one bit input by the left shift operation based on extended data "LowE" is suppressed.

Specifically, for example, by setting the initial value of "Num ExBits" to "−1", conditional judgment shown in the step ST210 in FIG. 14 can be omitted, and the processing can be performed at a high speed.

As explained above, in the present embodiment, as a result that the context independent type coding portion 275 is provided with the continuous judging portion for detecting whether continuous bit data to be encoded is context independent type having a characteristic of being capable of performing coding processing with the "Range" fixed; the first conversion portion 27531 for making the continuous bit data be binary data, and using as a new lower limit value "Low" a value obtained by adding a product of the binary data and a preset "Range" to a value obtained by performing a left shift operation exactly by a bit data length of the continuous bit data on the lower limit value "Low", and adding the bit length of the continuous bit data to bits of an extended region data "LowE", when the continuous judging portion 2751 detects that the continuous bit data is context independent type; the second conversion portion 27532 for adding the bit length of the continuous bit data to a bit length of extended region data and updating the bit length of the extended region data; and the normalizing portion 2754; continuous context independent type bit data can be encoded at a time, and the computation speed becomes high.

Also, by setting the initial value of "NumExtBits" to "−1", conditional judgment shown in the step ST210 in FIG. 14 can be omitted, and the processing can be performed at a high speed.

Namely, by eliminating judgment branches required in each bit output, the arithmetic processing can become high at speed.

Note that the present invention is not limited to the present embodiments and may be freely and suitably modified.

In the coding apparatus according to the present embodiment, a function according to the present invention was realized by hardware, but it is not limited to this embodiment. For example, by executing a program having a function according to the present invention explained above by a computer (data processing apparatus), the function according to the present invention may be realized.

Also, an example of being provided with a single processing portion and a continuous processing portion was explained, but it is not limited to this embodiment and, for example, only the continuous processing portion may be provided.

Also, the above embodiments may be combined to be embodied.

Also, an example of "CABAC" was explained as an example in the present embodiment, but it is not limited to this embodiment.

The embodiments explained above are for easier understanding of the present invention and not to limit the present invention. Accordingly, respective elements disclosed in the above embodiments includes all modifications in designs and equivalents belonging to the technical field of the present invention.

What is claimed is:

1. A coding apparatus comprising:
orthogonal transform means for transforming image data;
quantization means for quantizing the image data transformed by said orthogonal transform means; and
coding means for coding said image data quantized by said quantization means, said coding means including a context dependent type coding means to perform a left shift operation successively on a predetermined bit length of data region and a lower limit value until said predetermined bit length of data region exceeds a predetermined value, and to generate coding data in accordance with said predetermined bit length of data region before performing the left shift operation.

2. A coding method comprising the steps of:
orthogonally transforming image data;
quantizing the orthogonally transformed image data; and
coding said quantized, orthogonally transformed image data by context dependent type coding to perform a left shift operation successively on a predetermined bit length of data region and a lower limit value until said predetermined bit length of data region exceeds a predetermined value, and to generate coding data in accordance with said predetermined bit length of data region before performing the left shift operation.

3. A computer program embodied on a computer-readable medium for coding image data by:
orthogonally transforming said image data;
quantizing the orthogonally transformed image data; and
coding said quantized, orthogonally transformed image data by context dependent type coding to perform a left shift operation successively on a predetermined bit length of data region and a lower limit value until said predetermined bit length of data region exceeds a predetermined value, and to generate coding data in accordance with said predetermined bit length of data region before performing the left shift operation.

* * * * *